United States Patent
Allen et al.

(10) Patent No.: US 12,491,907 B1
(45) Date of Patent: Dec. 9, 2025

(54) TIME SIMULATION MANAGEMENT OF REAL WORLD SENSOR FRAME DATA

(71) Applicant: Zoox, Inc., Foster City, CA (US)

(72) Inventors: Stephen Lunt Allen, Santa Cruz, CA (US); Gaurav Kandpal, Nainital (IN); Nandkishor Jayaram Pore, Pune (IN)

(73) Assignee: Zoox, Inc., Foster City, CA (US)

( * ) Notice: Subject to any disclaimer, the term of this patent is extended or adjusted under 35 U.S.C. 154(b) by 206 days.

(21) Appl. No.: 18/416,691

(22) Filed: Jan. 18, 2024

(51) Int. Cl.
*B60W 60/00* (2020.01)
*B60W 50/04* (2006.01)
*G11B 27/34* (2006.01)

(52) U.S. Cl.
CPC ........ *B60W 60/001* (2020.02); *B60W 50/045* (2013.01); *G11B 27/34* (2013.01); *B60W 2420/403* (2013.01); *B60W 2556/00* (2020.02)

(58) Field of Classification Search
CPC ............. B60W 60/001; B60W 50/045; B60W 2420/403; B60W 2556/00; G11B 27/34
See application file for complete search history.

(56) References Cited

U.S. PATENT DOCUMENTS

| | | | | | |
|---|---|---|---|---|---|
| 4,439,157 | A * | 3/1984 | Breglia | ............... | G02B 27/0172 359/618 |
| 6,543,899 | B2 * | 4/2003 | Covannon | ............ | G02B 27/017 353/11 |
| 6,652,104 | B2 * | 11/2003 | Nishida | ................ | H04N 9/3185 353/69 |
| 6,877,863 | B2 * | 4/2005 | Wood | ................... | H04N 9/3185 353/42 |
| 7,070,283 | B2 * | 7/2006 | Akutsu | ..................... | H04N 5/74 353/30 |
| 7,119,965 | B1 * | 10/2006 | Rolland | ............. | G02B 27/0172 359/630 |
| 7,182,466 | B2 * | 2/2007 | Sunaga | ..................... | H04N 5/74 353/69 |
| 7,270,421 | B2 * | 9/2007 | Shinozaki | ............ | G03B 21/142 353/121 |
| 7,359,575 | B2 * | 4/2008 | Bassi | ........................ | G06T 3/18 345/427 |
| 7,441,906 | B1 * | 10/2008 | Wang | ..................... | G03B 21/14 353/121 |
| 7,782,387 | B2 * | 8/2010 | Azuma | ................... | H04N 25/68 359/662 |
| 8,676,427 | B1 * | 3/2014 | Ferguson | ............. | G08G 1/0965 701/23 |
| 9,753,126 | B2 * | 9/2017 | Smits | ..................... | G01S 17/003 |
| 9,810,913 | B2 * | 11/2017 | Smits | ..................... | G02B 5/124 |
| 10,067,230 | B2 * | 9/2018 | Smits | ..................... | G01S 17/86 |
| 10,261,183 | B2 * | 4/2019 | Smits | ..................... | G01S 7/4868 |
| 10,379,220 | B1 * | 8/2019 | Smits | ..................... | G01S 7/4811 |

(Continued)

*Primary Examiner* — Michael B. Pierorazio
(74) *Attorney, Agent, or Firm* — Lee & Hayes, P.C.

(57) ABSTRACT

Techniques for utilizing adjusted timestamps and updated hardware internal timers to drive sensor data (e.g., camera and/or video frames) are discussed herein. Timestamps can be adjusted to be adjusted timestamps based on simulation times and adjustment times. The adjustment times can include delays associated with frames being driven out of buffers. The adjustment times can further include delays associated with frames propagating through simulation devices. Internal timers can be updated to be updated timers based on numbers of timesteps between signals of primary clocks.

20 Claims, 5 Drawing Sheets

(56) References Cited

U.S. PATENT DOCUMENTS

| | | | | |
|---|---|---|---|---|
| 10,394,112 B2* | 8/2019 | Johnson | | A01M 1/223 |
| 10,473,921 B2* | 11/2019 | Smits | | G01S 17/87 |
| 10,496,766 B2* | 12/2019 | Levinson | | G05D 1/0088 |
| 10,591,605 B2* | 3/2020 | Smits | | G01S 17/42 |
| 10,663,626 B2* | 5/2020 | Benitez | | G02B 27/01 |
| 11,079,492 B1* | 8/2021 | Stumm | | G01C 21/3833 |
| 11,738,777 B2* | 8/2023 | Chu | | B60W 60/001 |
| | | | | 701/26 |
| 11,830,455 B2* | 11/2023 | Schriever | | G09G 5/005 |
| 12,162,500 B1* | 12/2024 | Egbert | | B60W 50/0205 |
| 2002/0051095 A1* | 5/2002 | Su | | H04N 9/3194 |
| | | | | 348/745 |
| 2002/0067466 A1* | 6/2002 | Covannon | | G02B 30/26 |
| | | | | 353/8 |
| 2002/0122161 A1* | 9/2002 | Nishida | | H04N 9/3194 |
| | | | | 353/70 |
| 2003/0191836 A1* | 10/2003 | Murtha | | H04L 67/02 |
| | | | | 709/224 |
| 2003/0210381 A1* | 11/2003 | Itaki | | H04N 5/74 |
| | | | | 353/70 |
| 2004/0156024 A1* | 8/2004 | Matsuda | | H04N 9/3185 |
| | | | | 353/70 |
| 2005/0046803 A1* | 3/2005 | Akutsu | | H04N 5/74 |
| | | | | 353/69 |
| 2005/0073661 A1* | 4/2005 | Tamura | | H04N 9/3194 |
| | | | | 353/70 |
| 2005/0151934 A1* | 7/2005 | Akutsu | | G03B 21/147 |
| | | | | 353/69 |
| 2005/0237492 A1* | 10/2005 | Shinozaki | | H04N 9/3185 |
| | | | | 353/69 |
| 2006/0098167 A1* | 5/2006 | Sato | | G03B 21/26 |
| | | | | 353/35 |
| 2006/0203207 A1* | 9/2006 | Ikeda | | H04N 9/3185 |
| | | | | 353/70 |
| 2007/0008344 A1* | 1/2007 | Medina | | G06T 15/10 |
| | | | | 345/647 |
| 2007/0257941 A1* | 11/2007 | Plut | | G06F 9/451 |
| | | | | 345/660 |
| 2007/0285626 A1* | 12/2007 | Miyasaka | | G03B 21/206 |
| | | | | 353/85 |
| 2009/0278999 A1* | 11/2009 | Ofune | | H04N 21/47 |
| | | | | 348/E3.048 |
| 2010/0002123 A1* | 1/2010 | Nozaki | | H04N 23/00 |
| | | | | 348/E5.022 |
| 2010/0045942 A1* | 2/2010 | Furui | | H04N 9/3194 |
| | | | | 353/69 |
| 2011/0085044 A1* | 4/2011 | Noda | | G03B 21/58 |
| | | | | 348/E5.133 |
| 2011/0210979 A1* | 9/2011 | Furui | | G03B 37/04 |
| | | | | 345/619 |
| 2011/0234994 A1* | 9/2011 | Uchiyama | | H04N 9/3185 |
| | | | | 353/121 |
| 2011/0285971 A1* | 11/2011 | Oka | | H04N 9/3185 |
| | | | | 353/70 |
| 2011/0292351 A1* | 12/2011 | Ishii | | H04N 9/3185 |
| | | | | 353/69 |
| 2013/0245877 A1* | 9/2013 | Ferguson | | G06V 20/56 |
| | | | | 701/23 |
| 2014/0303827 A1* | 10/2014 | Dolgov | | B60W 30/00 |
| | | | | 701/23 |
| 2015/0094897 A1* | 4/2015 | Cuddihy | | B60W 30/00 |
| | | | | 701/23 |
| 2015/0336502 A1* | 11/2015 | Hillis | | G05D 1/0088 |
| | | | | 701/23 |
| 2017/0240096 A1* | 8/2017 | Ross | | G05D 1/0212 |
| 2018/0158102 A1* | 6/2018 | Choi | | G06Q 30/0251 |
| 2019/0317507 A1* | 10/2019 | Zhang | | G05D 1/0278 |
| 2021/0168440 A1* | 6/2021 | Ho | | H04N 21/43632 |
| 2021/0310823 A1* | 10/2021 | Wilbers | | G01C 21/3811 |
| 2021/0341310 A1* | 11/2021 | Wilbers | | G01C 21/26 |
| 2022/0171412 A1* | 6/2022 | Cui | | G08B 3/10 |
| 2022/0201262 A1* | 6/2022 | Chen | | H04N 9/3185 |
| 2022/0242430 A1* | 8/2022 | Watano | | B60W 50/10 |
| 2023/0010713 A1* | 1/2023 | Park | | G01S 17/88 |
| 2023/0303124 A1* | 9/2023 | Cui | | B60W 60/0027 |

\* cited by examiner

TIME SIMULATION MANAGEMENT OF REAL WORLD SENSOR FRAME DATA

BACKGROUND

Simulations may be used to test operating software for autonomous vehicles. The simulations may re-create the world and obstacles within the world to accurately reproduce scenarios encountered by the autonomous vehicles. The simulations may be utilized to test and validate features, as well as functionalities of systems, of the autonomous vehicles. For example, the simulations may be utilized to test vehicle decision-making, vehicle sensor data analysis, and/or vehicle route optimization. Simulation data utilized for the simulations may include data captured by multiple sensors of the autonomous vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
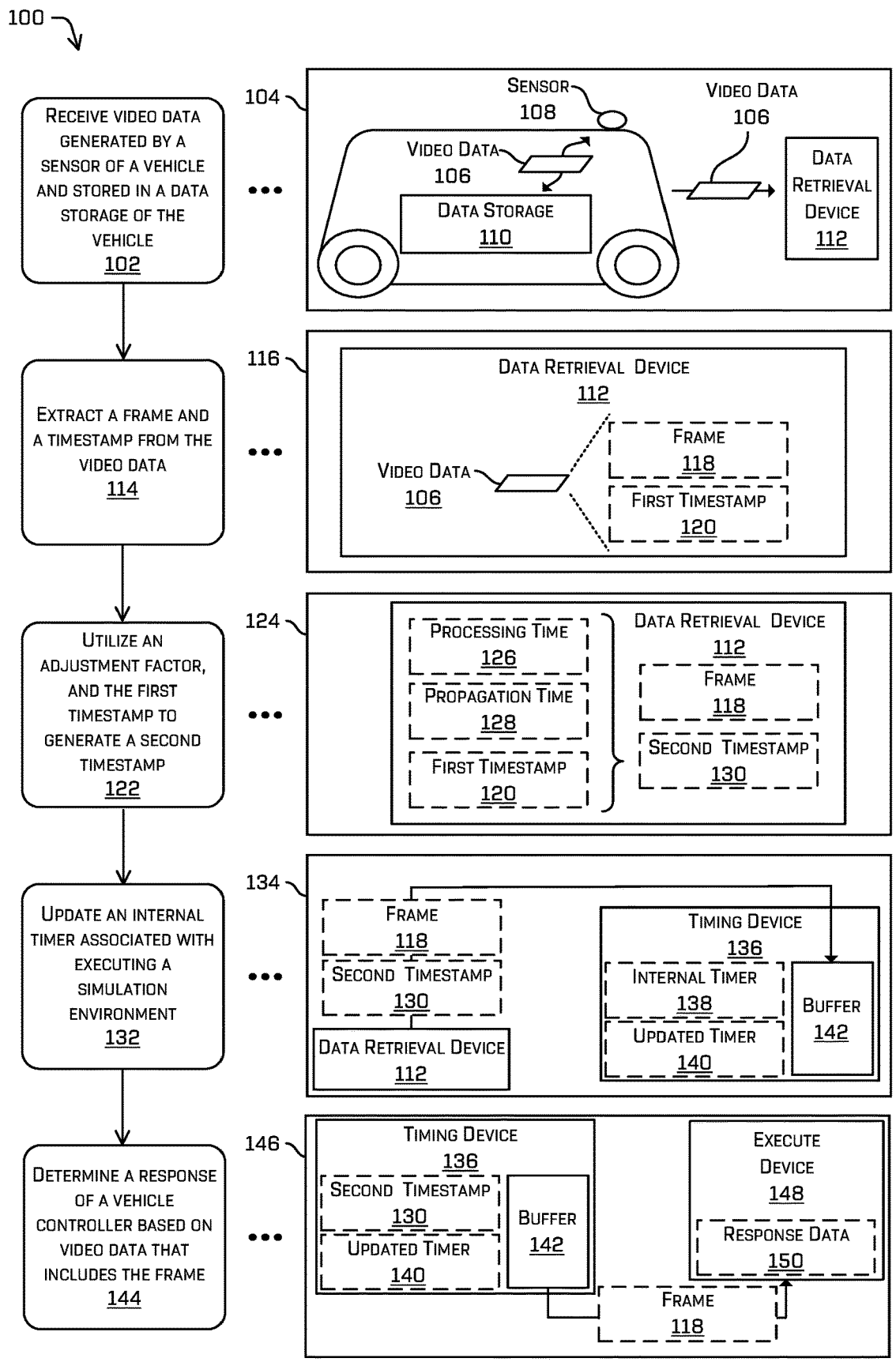
FIG. 1 is a pictorial flow diagram of an example process for utilizing adjusted timestamps and updated timers to perform simulations, in accordance with one or more examples of the disclosure.

Techniques are described herein for operating computing hardware accurately and precisely to execute simulations. For example, due to system delays, propagation delays, and drifting clocks, data expected to arrive at a processor may be early or late from when scheduled. The techniques discussed herein improve accuracy in reproducing the data timing in simulation to reflect (or more accurately reflect) the exact timing of data as captured, received, and processed on vehicle. By way of example, and without limitation, jitter experienced on-vehicle can be recreated in simulations.

In various examples, the simulations can be performed by adjusting timestamps of video data frames utilized for the simulations and updating internal timers of computing hardware that executes the simulations. The timestamps can be captured in the video data including the frames with which the timestamps are associated. The internal timers in the computing hardware can be updated and utilized to output the frames according to the adjusted timestamps. Simulation systems being utilized to execute the simulations can include computing hardware with the internal timers. The simulation systems can execute the simulations based on the adjusted timestamps and updated timers. The simulations can be utilized to generate responses of vehicle controllers to simulation environments.

The timestamps can be adjusted based on various types of adjustment data. The adjustment data can include processing times and propagation times. The processing times can be identified as times associated with processing of the video data through buffers for use in the simulation environments. The propagation times can be identified as times associated with the computing hardware. The propagation times can include times associated with propagation of the frames through the simulation systems. The times associated with driving the frames out of the buffers can be identified based on delays associated with processing durations for numbers of frames being driven out of the buffers. The times associated with propagation of the frames through the simulation systems can be identified based on delays associated with propagation durations for frames propagating through various devices of the computing hardware.

In some examples, hardware circuitry configured to deliver image data frames during simulation can include internal timers. The internal timers can be updated based on signals associated with primary timers and timestep data associated with the internal timers. The timestep data can include numbers of individual timesteps between signals of the primary timers. The internal timers can be updated by skipping or inserting timesteps of the internal timers. Based on the number of individual timesteps between signals in various cycles (e.g., initial cycles (or "original cycles"), previous cycles (or "earlier cycles"), any other cycles of various types and/or at various times, etc., or any combination thereof) of the primary timers, the internal timers can be updated by skipping or inserting the timesteps in subsequent cycles of the internal timers. For instance, individual ones of the cycles of the internal timers may correspond to periods of time between consecutive signals of the primary timers. The timesteps can be inserted or skipped in the internal timers to match numbers of the individual timesteps between signals of subsequent periods of the internal timers with the numbers of the individual timesteps between the signals of various periods (e.g., initial periods, previous periods, etc.) of the primary timers. The updated internal timers can be utilized to drive the frames out of the buffers based on the adjusted timestamps. The timers, such as the primary timers and/or the internal timers, can include various types of timers, such as clocks and/or oscillators.

The simulation systems can include various types of computing hardware for collecting, storing, and processing the video data for performing the simulations. The computing hardware can include data retrieval devices, which can be utilized to adjust the timestamps. The computing hardware can include timing devices, and buffers in the timing devices. The buffers can be utilized to receive the frames of the video data in the timing devices. The computing hardware can include the timing devices for driving the frames out of the buffers. The computing hardware can include execute devices to receive the frames being driven according to the updated internal timers. The timing devices can drive the frames with the adjusted timestamps out of the buffers based on the updated internal timers. The buffers can receive the frames from storage devices after processing of the frames. The processing may include decoding and identifying timing for driving the frames from the buffers of the timing devices and to the execute device. The simulation systems can include the storage devices to store the video data with the frames from the vehicles.

The techniques discussed herein can improve a functioning of computing devices in various additional ways. The improvements to the functioning of the computing can include providing technical advantages for generating and executing driving simulations. By providing driving simulations that are more accurate and precise, the driving simulations themselves may represent real-world driving scenarios more accurately. The more accurate and precise the driving simulations may be more valuable for evaluating the performance of vehicle controllers for autonomous and semi-autonomous vehicles.

For example, in some simulations, slight time deviations and/or imperfections associated with the timestamps captured by the vehicles may be accurately and precisely reproduced during the simulations. Video data may include frames being captured with the slight time deviations due to jitter, temporal delays, temporal advancements, or any other characteristics resulting from variations in the computing hardware. The time deviations of the frames being captured by sensors may include time deviations with respect to other video data and/or frames captured by the sensors at other times. The time deviations of the frames may include time deviations with respect to other video data and/or frames captured by other sensors. The time deviations may include time deviations of relatively small percentages of timesteps of timers of the computing hardware.

In contrast to conventional technology that may experience incidental inaccuracies and imprecisions during execution of computing hardware utilized to identify times for driving frames during simulations, the simulation systems according to the techniques discussed herein can accurately and precisely reproduce the time deviations associated with the captured data. While existing systems may employ simplified, inexact, and inherently flawed times to drive frames at rough and inexact times relative to rough and inexact times at which frames are driven during simulations, the timers and/or the timestamps associated with the frames being utilized according to the techniques discussed herein can be carefully updated to ensure the frames are correctly driven out for the simulations on an ongoing basis and/or over extended periods of time.

As an example, existing simulation systems may start frame delivery at a specific time and then drive the frames periodically after that. The frames may be delivered in the existing simulation systems with or without some added test jitter which does not represent actual real-world jitter. The frames may be passed through to a unit under test without any significant correlation to real-world-time, resulting in frames being delivered that are spread apart (e.g., frames separated by 50-100 microseconds (µS), more than 100 µS, etc., any other amount of time) much more than how the frames were intended to be delivered. The frames being further spread apart results from normal hardware delays in storing and driving frames all at once. The delays can result in bandwidth bottlenecks. Although the bandwidth bottlenecks that are associated with the hardware of existing systems may be tested for worst case performance, this cannot be utilized to determine how a system performs in the real world with real camera data.

Limitations of existing systems that prevent correct execution of real-world simulations results from problems occurring in common techniques, as well as the software and hardware infrastructures of the existing systems. Existing systems being controlled to ensure that an average data rate (e.g., framerate) is maintained during log playback cause other timing characteristics related to jitter and min/max instances of framerates to be incorrect. The incorrect timing characteristics cause simulation timings (e.g., timings of video frame delivery) to be significantly off. Timing devices (e.g., even with fault tolerant field programmable gate arrays (FPGAs), ASICs, processors, etc.) of existing simulation systems may be unable to ensure correct buffering. The devices of existing simulation systems may be unable to generate timestamps that accurately reproduce behavior of primary management devices (e.g., host devices).

In contrast to conventional technology that may experience incidental inaccuracies and imprecisions with respect to timers utilized to execute simulations, the simulation systems according to the techniques discussed herein can control internal timers accurately and precisely. While the timers of existing systems may experience variations based on unpredictable and unidentified numbers of timesteps between signals in timers, the internal timers being controlled according to the techniques discussed herein to drive frames of video data can be accurately and precisely controlled and/or updated based on a primary timer. The simulations being performed by driving frames according to the techniques discussed herein may use various interfaces, such as a video/mobile industry processor interface (MIPI), a peripheral component interface (PCI), a display port interface, etc., any number of one or more other interfaces, or a combination thereof. The frames may be processed utilizing one or more graphics processing units (GPUs). Updating a timestamp associated with image data and outputting the image data based on the updated timestamp and internal timers according to the techniques discussed herein can be utilized to perform simulations more accurately and precisely to reflect the actual condition on-vehicle while in simulation.

Additionally, by combining together adjustments of the timesteps and updates of the internal timers according to the techniques discussed herein, response data identified based on the simulations can be generated more effectively. By generating the response data more effectively, control systems associated with the vehicles can be designed to improve reliability of the vehicles and increase safety of passengers utilizing the vehicle.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configure to input data to determine movement associated with objects in an environment. Additionally, the techniques described herein can be used with real data (e.g., captured using sensor(s)), simulated data (e.g., generated by a simulator), or any third of the two.

FIG. 1 is a pictorial flow diagram of an example process 100 for utilizing adjusted timestamps and updated timers to perform simulations, in accordance with examples of the disclosure.

An operation 102 can include receiving video data generated by a sensor of a vehicle and stored in a data storage of the vehicle. The sensor can include a video sensor, such as a camera, which can generate the video data based on light captured by the camera while the vehicle traverses an environment. The video data being generated by the sensor can include one or more frames and/or one or more timestamps associated with the frames. Of course, the vehicle can include any number of image sensors (e.g., 2, 4, 8, 10, 16, etc.) with the same, or different, properties. Alternatively or additionally, the sensors may include one or more other sensors of various types, which may be utilized to capture the same, or different, types of data. For instance, the vehicle can include lidar sensors, radar sensors, sonar sensors, time-of-flight sensors, and the like. The sensor data can be combined or fused later for processing, including but not limited to object detection or segmentation. In various examples, the vehicle includes one or more drivers and/or one or more receivers utilized to manage (e.g., identify, determine, generate, modify, store, update, delete, communicate, etc.) the sensor data. In various examples, data generated by the sensor(s) can include one or more types of data, including metadata, integrated as part of, and/or associated with, the sensor data. In various examples, individual one of the frames include one or more frames associated with any of various types (or "modalities") of sensor data (e.g., image data, lidar data, radar data, sonar data, time-of-flight data, etc., or any combination thereof).

An example 104 illustrates an environment in which one or more vehicles are and/or were traversing (e.g., moving along a road). The vehicle(s) can include various types of sensors utilized to capture various types of data. For example, the vehicle(s) can include a vehicle that includes a sensor 108 and data storage 110. The sensor 108, which can include a camera, can be utilized to capture light and generate video data 106 representing the captured data. The video data 106, which can include the frame(s) and/or the timestamp(s), can be stored in the data storage 110.

The timestamp(s) can identify, and/or include one or more corresponding identifiers of, one or more corresponding times at which the frame(s) are generated. In various examples, the timestamp(s) can be generated along with the frame(s) by the sensor 108. In alternative or additional examples, the timestamp(s) can be inserted into the video data 106 by the sensor 108. The frame(s) and/or the timestamp(s) can be managed (e.g., identified, determined, generated, modified, stored, updated, deleted, communicated, etc.) by one or more vehicle systems, which can include, and/or be communicatively coupled to, the sensor 108. The timestamp(s) can identify one or more corresponding times at which the frame(s) are generated. The frame(s) can be generated utilizing one or more timers of the vehicle system(s).

The vehicle can communicate the video data 106 to one or more computing devices. The computing device(s) can include one or more remote devices and/or one or more external devices. For example, the external device(s) can include a data retrieval device 112 that retrieves the stored video data 106 from the data storage 110 for extraction (e.g., as explained below in further detail, in operation 114) and simulation. For example, the data retrieval device 112 may retrieve the video data 106, and extract the frame(s) from the video data 106. In such an example or another example, the video data 106 can include data that is generated and/or captured utilizing one or more timers of the vehicle.

An operation 114 can include extracting a frame and a timestamp from the video data 106. The video data 106 can be processed by the data retrieval device 112. The data retrieval device 112 can extract the frame and the timestamp generated by, and received from, the vehicle.

An example 116 illustrates an environment in which one or more external device(s) process the video data 106. For example, the video data 106 can be processed by the data retrieval device 112 to extract a frame 118 from the video data 106, the frame 118 being included in the frame(s). In such an example or another example, the video data 106, can be processed by the data retrieval device 112 to extract a first timestamp 120 from the video data 106, the first timestamp 120 being included in the timestamp(s).

The first timestamp 120, which may be associated with the frame 118 can identify, and/or include an identifier of, a time at which the frame 118 is generated by the sensor 108. For example, the first timestamp 120 can include the identifier, which can include a value of the time at which the frame 118 is generated. In some examples, the first timestamp 120 can be accurate to a percentage of an amount of time between timesteps of a timer utilized to generate the frame 118, the percentage being less than a threshold percentage.

An operation 122 can include utilizing an adjustment factor and the first timestamp 120 to generate a second timestamp (or "simulation timestamp"). In various examples, the timestamp(s) can be utilized to manage (e.g., identify, determine, generate, modify, store, update, delete, communicate, etc.) one or more adjusted timestamp(s), such as the second timestamp.

The adjusted timestamp(s) may be based on various types of data. In some examples, the adjusted timestamp(s) may be based on the timestamp(s). In those or other examples, the adjusted timestamp(s) may be based on the timestamp(s) and/or one or more adjustment factors (or "adjustment time(s)"). In those or other examples, the adjustment factors can include one or processing times and/or one or more propagation times.

In some examples, one or more processing times, which can include the processing time, can be managed (e.g., identified, determined, generated, modified, stored, updated, deleted, communicated, etc.) by the computing device(s). In those or other examples, one or more propagation times, which can include the propagation delay, can be managed (e.g., identified, determined, generated, modified, stored, updated, deleted, communicated, etc.) by the computing device(s).

The processing time(s) and/or the propagation time(s) may be based on one or more of various types of computing hardware of the computing device(s). In some examples, the processing time(s) and/or the propagation time(s) may be associated with processing the video data 106 for use in the environment, which may be, and/or which can include, a simulation environment. In those or other examples, the processing time(s) may be associated with one or more times utilized to drive one or more numbers of frames out of one or more buffers. In those or other examples, the propagation time(s) may be associated with one or more times utilized to propagate one or more frames through one or more portions of the computing device(s).

An example 124 illustrates the data retrieval device 112, which can be utilized to generate a second timestamp 130 based on a simulation time (e.g., the Time$_{Simulation}$, as discussed below with respect to FIG. 2) of one or more simulation times associated with one or more simulations, a processing time 126 of the processing time(s), a propagation time 128 of the propagation time(s), and the first timestamp 120. In various examples, the simulation time(s) can include one or more initial times and/or one or more start times corresponding to one or more starts of one or more simulations. For instance, a simulation time associated with a simulation can be associated with an event (e.g., a simulation event). An example of the simulation time can include a time in the future associated with executing the simulation.

The second timestamp 130 in the adjusted timestamp(s) can be generated based on various types of data. In some examples, the second timestamp 130 being included in the adjusted timestamp(s) can be generated based on the simulation time(s), the processing time(s), the propagation time(s), and the first timestamp 120. In some examples, the second timestamp 130 in the adjusted timestamp(s) can be generated based on the simulation time, the processing time 126, the propagation time 128, and/or the first timestamp 120. In various cases, the adjustment factor can include a processing time, a propagation time, and/or any other type of adjustment factor. In various cases, the processing time 126 can include a processing delay, or any other type of processing time. In various cases, the propagation time 128 can include a propagation delay, or any other type of propagation time.

The processing time 126 and/or the propagation time 128 may be based on various portions of the computing device(s). The processing time 126 and/or the propagation time 128 may be based on the computing hardware of the computing device(s). In some examples, the processing time 126 and/or the propagation time 128 may be associated with processing the video data 106 for use in the simulation environment. In those or other examples, the processing time 126 may be associated with a time from among the time(s) utilized to drive a number of frames from among the number(s) of frames out of the buffer(s). For instance, the processing time 126 may include a product of the number of frames (e.g., four frames), and a time (e.g., 0.05 seconds, which in some cases can be determined based on a frame rate of an image sensor (e.g., 20 Hz)), utilized by individual ones of the frame(s) to be driven out of the buffer.

Although the number of frames may include four frames and the time may include the amount of time (e.g., 0.05 seconds) for driving individual frames, as discussed above in the current disclosure, it is not limited as such. In various examples, the number of frames and/or the time for driving individual ones of the frame(s) may include any number and/or any time, respectively. In those or other examples, the number of frame(s) and/or the time for driving the frame(s) may be determined in various ways, such as with the number of frame(s) and/or the time for driving the frame(s) being determined empirically. The number of frame(s) and/or the time for driving the frame(s) may be determined based on system configurations, constraints, performance attributes, costs (e.g., associated with one or more deviations and/or one or more errors), etc.

In some instances, the amount of time for driving individual frames may include 0.05 seconds, which may be interpreted simply as the rate at which the cameras on the vehicle are driving frames. Based on the amount of time for driving individual frames being 0.05 seconds, for example, an amount of time that includes (4*0.05) seconds, corresponding to an amount of time for driving four frames, may be used as a buffer depth. Because video data received at various points in the vehicle may be delivered at amounts of time that do not correspond exactly to 20 hertz (hz) edges (e.g., amounts of time that are not exactly 0.05 second time marks), the buffer depth enables the buffer to fill up with a number of frames (e.g., four frames). The buffer filling up with the number of frames (e.g., four frames) based on the buffer depth enables the video stream to be output without timing violation errors. In some cases, the video stream being output without any timing errors, based on another delta (e.g., a delta of 2*0.05) may be sufficient, for example, but using the four frame buffer time provides an extra defense against the incoming video stream glitching due to an operating system timing jitter or another issue.

In those or other examples, the propagation time 128 may be associated with a time (e.g., $1/30$ seconds, $1/60$ seconds, etc.) from among the time(s) utilized to propagate a frame from among the frame(s) through the portion(s) of the computing device(s). The time, such as $1/30$ seconds, $1/60$ seconds, etc., utilized as the time to propagate the frame, which may correspond to 30 hz, 60 hz, etc., respectively, may represent a capability of a data routing device (e.g., the data routing device 210, as discussed below with reference to FIG. 2) to dispatch video data on a clock boundary of the data routing device 210. For instance, the propagation time 128 may be associated with a time utilized to propagate a frame through a timing device (e.g., the timing device 136, as discussed below) and to a simulation device. (e.g., the execute device 148, as discussed below) (e.g., the execute device 218 in the simulation device 216, as discussed below with reference to FIG. 2). In some examples, the propagation time 128 can be determined empirically.

The propagation time 128 may be utilized to drive the frames from the timing device 136 at correct times. In some instances, the timing device 136 may be connected to various interfaces (e.g., a display port interface), and may utilize processors (e.g., GPUs) to drive the frames out to the buffer on vsync boundaries, based on a refresh rate. As a result, individual frames, which may be timed by the data retrieval device 208, may be pushed to buffers in the timing device 136 only on a next vsync boundary by adding a time to account for propagation (e.g., the propagation time 128). While increasing a refresh rate and increasing a periodicity of the vsync may help to reduce propagation delay of a system, the propagation time 128 ensures that the frames are driven out of the buffer of the timing device 136, notwithstanding any delays due to GPU capabilities and FPGA capabilities. The propagation time 128 accounts for various system conditions which may occur, such as network propagation delays, PCI card bandwidth contentions, instantaneous loads on the system, and so on.

Delivery of a frame from the timing device(s) 136 starts at a certain time on a card of the timing device(s) 136. The delivery takes a non-zero time to propagate through a chip of the simulation device/system (e.g., the system 200, as discussed below with reference to FIG. 2), off the chip, and through serializers of the simulation device (e.g., serializers that match hardware on the vehicle). The time to propagate through the chip, being identified within, and/or as, a delay range associated with the propagation, can be calculated as the propagation time 128 based on the actual hardware of the system.

In various examples, a display port and a GPU of the simulation system may drive the frame 118 out to the timing device 136 on a vertical synchronization (e.g., vsync) boundary, which is based on the refresh rate of the simulation system. For instance, if frames being driven are timed by the data routing device 210, the frames will be pushed out to buffers in the timing device 136 (e.g., the timing device 212, as discussed below with reference to FIG. 2). The frames can be pushed out to the buffers in the timing device 136 only on a next vsync boundary and after a propagation delay (or "propagation time") (e.g., the propagation time 128) added by the next vsync boundary. A relatively high refresh rate, for example, may be utilized to increase the periodicity of the vsync and to reduce the propagation delay. A limit of the refresh rate based on GPU capability and FPGA capability associated with the simulation system may result in, and/or enable, the relatively high refresh rate to be selected.

Although the propagation time 128 may be $1/30$ seconds or $1/60$ seconds, as discussed above in the current disclosure, it is not limited as such. In various examples, the propagation time 128 may be any other time, such as $1/45$ seconds, $1/90$ seconds, $1/120$ seconds, etc. In some examples, the second timestamp 130 being included in the adjusted timestamp(s) can be generated based on the simulation time, the processing time 126, the propagation time 128 (e.g., 1/45 seconds, 1/90 seconds, 1/120 seconds, etc.), and/or the first timestamp 120.

An operation 132 can include updating an internal timer associated with executing a simulation environment. The computing device(s) can include one or more timers, which can include one or more primary timers (e.g., one or more system timers) and/or one or more internal timers. For instance, the timer(s), which can include one or more clocks, can include individual ones of one or more primary clocks as any of the primary timer(s) and/or individual ones of one or more internal clocks as any of the internal timer(s). The computing hardware included in the computing device(s) can include the internal timer(s), which can be managed based on the primary timer(s).

In some examples, the computing device(s) can be utilized to manage (e.g., identify, determine, generate, modify, store, update, delete, etc.) the primary timer(s) and/or the internal timer(s). The internal timer(s) can be updated utilizing the primary timer(s) and utilized to drive the frame(s) out of the buffer(s). The internal timer(s) can be updated to be one or more corresponding updated timers. For instance, the frame(s) can be transmitted by the data retrieval device 112, via a data routing device (e.g., the data routing device 210, as discussed below with reference to FIG. 2), and to the timing device 136, such as to the buffer(s) in the timing device 136, from which the frame(s) can be driven utilizing the updated timer(s). The frame(s) can be driven out of the timing device 136 utilizing the second timestamp 130, which can be communicated for purposes of driving the frame(s) out of the buffer(s).

An example 134 illustrates a timing device 136, which can operate (e.g., identify, determine, generate, modify, store, update, delete, etc.) an internal timer 138 from among the internal timer(s) based on a primary timer from among the primary timer(s). The primary timer can be utilized to manage (e.g., identify, determine, generate, modify, store, update, delete, etc.) the internal timer 138 and/or an updated timer 140. In various examples, the updated timer 140 can be managed (e.g., identified, determined, generated, modified, stored, updated, deleted, etc.) based on the internal timer 138.

While multiple primer timer(s) may exist and/or be utilized, as discussed above in the current disclosure, it is not limited as such. In various cases, primary timer functionality may be provided by only a single overarching primary timer, which may be utilized for purposes of any functions of any or all of the primary timer(s), as discussed herein. For instance, the primary timer may act as a single timer for purposes of controlling any of the other timer(s) (e.g., the internal timer 138, the updated timer 140, any other time, or any combination thereof). The timing device 136 may control any of the internal timer(s) based on the primary timer.

In some examples, the computing device(s) being utilized to manage the internal timer(s) can include the timing device 136, which can utilize the internal timer(s) to output the frame(s) to an execute device (e.g., the execute device 148, as discussed below). The timing device 136 can be utilized to manage the internal timer 138 and the updated timer 140, based on the primary timer. The internal timer 138 can be controlled and/or updated to be the updated timer 140. Updating the internal timer 138 to be the updated timer 140 can be performed utilizing the primary timer. The internal timer 138 can be updated by adding or skipping timesteps to generate the updated timer 140. Based on a total number of timesteps of the primary timer in a cycle (e.g., a previous cycle, an initial cycle, etc.), the updated timer 140 can be controlled to have the same total number of timesteps in subsequent cycles. The updated timer 140 can be updated on an ongoing basis, taking into account a rolling average as time goes on. The timing device 136 can manage any current value of the updated timer 140 as an average of any number of preceding cycles of the internal timer 138 (e.g., or the updated timer 140). In some examples, the cycle, such as a cycle (e.g., a previous cycle, an initial cycle, etc.) and/or individual ones of one or more other cycles, utilized to generate the updated timer 140, for instance, may include one or more cycles (e.g., a period of time associated with one or more cycles, and/or individual ones of the cycle(s)) of the primary timer, the internal timer 138, the updated timer 140, any other timers, or any combination thereof. In those or other examples, a cycle may include a period of time between consecutive signals (e.g., seconds) of any of one or more cycles of the primary timer, the internal timer 138, and/or the updated timer 140.

The internal timer 138 can be updated to be the updated timer 140 and utilized in various ways based on the primary timer. In some examples, based on a total number of timesteps between a pair of consecutive signals (e.g., seconds) of the primary timer, the internal timer 138 can be updated to be the updated timer 140 having the same total number of timesteps between subsequent pairs of consecutive signals (e.g., seconds) of the updated timer 140. In those or other examples, based on a total number of timesteps in a cycle of the updated timer 140 being synchronized with the primary timer, the updated timer 140 can be controlled to have the same total number of timesteps in a cycle of the updated timer 140. For instance, the updated timer 140 can be synchronized with the primary timer.

The updated timer 140 can be utilized to drive the frame 118 out of one or more buffers, such as a buffer 142, in the timing device 136. For instance, the frame 118 can be transmitted by the data retrieval device 112 and to the buffer 142, from which the frame 118 can be driven by utilizing the updated timer 140. The frame 118 can be driven utilizing the second timestamp 130, which can be communicated for purposes of driving the frame 118 out of the buffer 142.

The timing device 136 may include a same internal timer (e.g., which may be updated as an updated timer) as one or more other devices (e.g., the execute device 148). However, although the timing device 136 may include the same internal timer as the other device(s) (e.g., the execute device 148), it is not limited as such. In various examples, the timing device 136 may include an internal timer (e.g., an internal timer being updated as an updated timer) that is different from an internal timer (e.g., an internal timer being updated as an updated timer) of the execute device 148 for purposes of implementing any of the techniques discussed herein. The internal timer of the timing device 136 may be of a same type as, or a different from, the internal timer of the execute device 148.

An operation 144 can include determining a response of a vehicle controller based on the video data 106 that includes the frame 118. In various examples, one or more types of response data can be managed (e.g., identified, determined, generated, modified, stored, updated, deleted, communicated, etc.) based on the video data 106. The response data may be based on the frame(s) being driven out of the buffer(s) based on the adjusted timestamps(s) and the updated timer(s).

An example 146 illustrates the environment including the timing device 136 and an execute device 148. The execute device 148 (e.g., the execute device 218, as discussed below with reference to FIG. 2) can be included in a simulation device (e.g., the simulation device 216, as discussed below with reference to FIG. 2). In various examples, the timing device 136 can utilize the second timestamp 130 and the updated timer 140 to output the frame 118 from the buffer 142, and to the execute device 148. Outputting the frame 118 can include driving the frame 118 from the buffer 142 based on a timestep associated with the updated timer 140 being greater than, or greater than or equal to, the second timestamp 130. For instance, the updated timer 140 can be incremented by one or more timesteps. The updated timer 140 having a value of a timestep from the timestep(s) that is greater than or equal to the second timestamp 130 can be utilized to drive the frame 118 from the buffer 142 and to the execute device 148.

The execute device 148 can perform one or more of various functions based on the video data 106. In some examples, the execute device 148 can generate the response data 150 based on the video data 106. In those or other examples, the execute device 148 can generate the response data 150 based on the frame 118. By utilizing the adjusted timestamp(s) including the second timestamp 130 and the updated timer(s) including the updated timer 140 to drive the video data 106 from the buffer(s) including the buffer 142, the response data 150 can be generated utilizing accurate and precise delivery of the video data 106. The accurate and precise delivery of the video data 106, such as accurate and precise delivery of the frame 118 at the second timestamp 130 utilizing the updated timer 140, may enable the execute device 148 to generate accurate, precise, and meaningful data including the response data 150.

The updated timer 140 can be precise and accurate, notwithstanding the primary timer having various time durations between cycles. The cycles can correspond to time periods from timestep (e.g., time mark) to timestep (e.g., time mark) of the primary timer. The updated timer 140 can be precise and accurate, notwithstanding the primary timer not having a level of granularity that is greater than a granularity level threshold (e.g., not having a level of granularity that is at or lower than one second). For instance, the primary timer may have a level of granularity down to a second, which may be less than a level of granularity of the updated timer 140, which may be accurate down to a millisecond, a microsecond, a nanosecond, etc.

The updated timer 140 can be generated to have the same amount of time between any corresponding pair of a plurality of pairs of consecutive signals as the primary timer. The updated timer 140 can have cycles with the same amount of time as for corresponding cycles of the primary timer. The cycles of the updated timer 140 matching corresponding cycles of the primary timer may be a result of the updated timer 140 being generated to have matching cycles. The updated timer 140 can be generated to have the same amount of time between a pair of signals as for a corresponding pair of signals of the primary timer. The updated timer 140 may be precise based on the primary timer being precise (e.g., not having a tendency to vary over relatively long periods of time).

The updated timer 140 being accurate can include the total number of timesteps of the updated timer 140 corresponding to a pair of signals of the primary timer being the same as the total number of timesteps of the updated timer 140 corresponding to another pair of signals (e.g., one or more subsequent pairs of signals) of the primary timer. For instance, the total number of timesteps of the updated timer 140 for any cycle of the primary timer may be the same as the total number of timesteps of the updated timer 140 for any other cycle (e.g., one or more subsequent cycles) of the primary timer. The updated timer 140 may have a fewer or greater total number of timesteps between a pair of consecutive signals than a predetermined total number of timesteps (e.g., 1,000,000 timesteps). The updated timer 140 may be updated periodically, for instance, based on changes in the number of timesteps between subsequent signals (e.g., time marks) of subsequent cycles of the primary timer.

While the level of granularity of the primary timer may be one second, as discussed above in the current disclosure, it is not limited as such. The time delivered via the primary timer can be basically any distance from time mark to time mark. This may include one second, but it could be variable, such as a longer time (e.g., 5 seconds), etc. The same concept may apply for calculating leap ticks/fall ticks (e.g., inserting or skipping timesteps for the internal timer). The only main presumption, for example, may be that the primary timer is as accurate as needed (e.g., with all other internal timers following/matching their accuracy and precision to that). In various examples, the updated timer 140 may include any level of granularity that is lower (e.g., finer) than the level of granularity of the primary timer.

The response data 150 may be utilized in various ways. In some examples, the frame 118 can be output to a perception component to perform at least one of object detection, sensor fusion, or segmentation. The frame(s), including the frame 118, of the video data 106, can be output to the perception component to perform at least one of the object detection, the sensor fusion, or the segmentation a part of the simulation. In those or other examples, the response data 150 can indicate results of combining the video data 106, which includes the frame 118, with various types of data. For instance, the video data 106 can be combined with radar data and/or lidar data. In such an instance or another instance, the video data 106, the radar data, and/or the lidar data may represent the same object. By combining any of the different types of data, the object may be identified. By combining any of the different types of data, one or more responses of one or more vehicle controllers may be generated and included in the response data 150. A response may indicate whether the object is identified. In some instances, the video data 106 may be combined with the radar data and/or the lidar data as part of a simulation to perform sensor fusion.

Although the terms "internal timer" and "updated timer" are utilized for the internal timer 138 and the updated timer 140 for purposes of simplicity and ease of explanation, as discussed above in the current disclosure, it is not limited as such. In various examples, the terms "internal timer" and "updated timer" may be interpreted as being interchangeable. In various examples, the internal timer 138 may be interpreted as being the same as the updated timer 140 and/or any of the other internal timer(s), with any of the internal timer(s) skipping or inserting the same number of timesteps as any other internal timer.

Although the terms "buffer" and "buffer(s)" are utilized for ease of simplicity and explanation, as discussed above in the current disclosure, it is not limited as such. In some examples, the terms "buffer" and "buffer(s)" may be interpreted as being interchangeable, the same as one another, or different from one another, as is appropriate to the circumstances.

Although the terms "time(s)" and "timestamp(s)" are utilized in various ways as discussed above in the current disclosure, it is not limited as such. In various cases, the terms "time(s)" and "timestamp(s)" may be interpreted as being interchangeable, the same as one another, or different from one another, as is appropriate to the circumstances. In some examples, the term "timestamp(s)" may be utilized to refer to data associated with a time, and/or any type of data structure being utilized to identify the time. In those or other examples, the term "timestamp(s)" may refer to a sequence of characters or encoded information identifying when a certain event occurred, such as when video data and/or a frame is captured.

Although computing hardware may be operated for executing simulations, as discussed above in the current disclosure, it is not limited as such. In various examples, any portions of various systems, such as computing systems that include hardware, software, firmware, etc., or any combination thereof, may be utilized for executing simulations in a similar way as for the computing hardware for purposes of implementing any of the techniques discussed herein.

Figure 2:
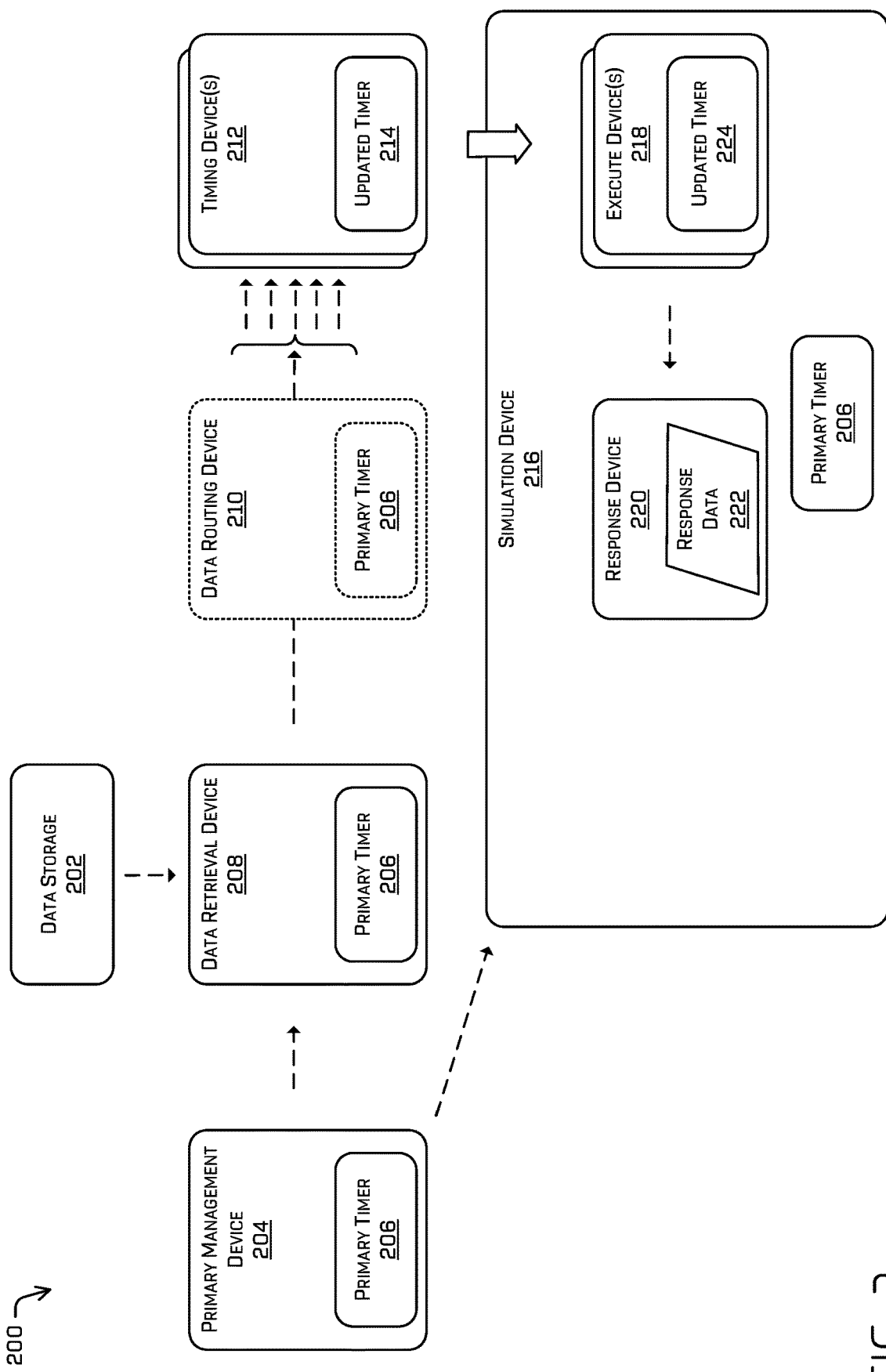
FIG. 2 is an example system for performing simulations, in accordance with one or more examples of the disclosure.

FIG. 2 is an example system 200 for performing simulations, in accordance with examples of the disclosure. In various example, the system 200 can include a data storage 202 and a primary management device 204. The data storage can be utilized to store one or more types of video data (e.g., the video data 106 as discussed above with reference to FIG. 1).

The primary management device 204 can be utilized to control the system 200 and/or to manage (e.g., identify, determine, generate, modify, store, update, delete, etc.) data associated with the system 200. The primary management device 204 can include, and/or be communicatively coupled to, a primary timer 206. The primary management device 204 can be utilized to manage (e.g., identify, determine, generate, modify, store, update, delete, etc.) the primary timer 206.

In some implementations, the primary management device 204 can include one or more artificial intelligence (AI) devices and/or one or more machine learned (ML) model devices. The primary management device 204 can be utilized to initiate one or more simulations utilizing one or more simulation environments. For example, the primary management device 204 can be utilized to initiate a simulation from among the simulation(s), the simulation utilizing a simulation environment of the simulation environment(s).

In various implementations, the ML model device(s) may operate utilizing one or more ML models of various types. In various cases, the ML model(s) used by the techniques and systems described herein may represent a single model or an ensemble of base-level ML models, and may be implemented as any of one or more types of ML model. For example, suitable ML models for use by the techniques and systems described herein include, without limitation, neural networks (e.g., generative adversarial networks (GANs), deep neural networks (DNNs), recurrent neural networks (RNNs), etc.), tree-based models (e.g., eXtreme Gradient Boosting (XGBoost) models), support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can comprise a collection of ML models whose outputs (predictions) are combined, such as by using weighted averaging or voting. The individual ML models of an ensemble can differ in their expertise, and the ensemble can operate as a committee of individual ML models that is collectively "smarter" than any individual ML model of the ensemble.

The ML model(s) may be trained based on one or more training datasets, which may include any types of data as discussed throughout the current disclosure. In some examples, the training dataset(s) used to train the ML model(s) described herein can include one or more features and/or one or more labels. However, the training dataset(s) may be unlabeled, in some examples. Accordingly, the ML model(s) described herein may be trained using any suitable learning technique, such as supervised learning, unsupervised learning, semi-supervised learning, reinforcement learning, and so on. The features included in the training dataset(s) can be represented by one or more sets of features, such as in the form of an n-dimensional feature vector of quantifiable information about an attribute of the training dataset(s).

The simulation environment can include one or more devices, which can include the primary management device 204, a data retrieval device 208, one or more data routing devices 210, one or more timing devices 212, a simulation device 216, one or more execute devices 218, a response device 220, and/or one or more other devices of various types. In some examples, individual ones of the timing device(s) 212 can be utilized to implement the timing device 136, as discussed above with reference to FIG. 1. In those or other examples, individual ones of the execute device(s) 218 can be utilized to implement the execute device 148, as discussed above with reference to FIG. 1.

In various cases, individual ones of the timing device(s) 212 (e.g., frame driver boards) may include a number of groups of video data associated with a number of cameras. For instance, a timing device 212 may be utilized to drive four groups of video data generated by four cameras. In such an instance of another instance, any number of the groups of video data may be driven out of individual ones of the timing device(s) 212 and to corresponding execute device(s) 218. For example, the timing device(s) 212 may include a timing device 212 utilized to drive four groups of video data to a execute device 218 of the execute device(s) 218.

In various examples, the timing device(s) 212 may be connected to one or more processors, such as one or more graphics processing units (GPUs). In those or other examples, the timing device(s) 212 may be connected to the GPUs over one or more interfaces, such as a display port interface. The timing device(s) 212, for example, may be responsible for managing an internal timer/updated timer (e.g., the internal timer 138/updated timer 140, as discussed above with reference to FIG. 1) based on the primary timer. The timing device(s) 212, for example, releases frame(s) from the buffer(s) (e.g., the buffer 142, as discussed above with reference to FIG. 1) based on a second timestamp (e.g., the second timestamp 130, as discussed above with reference to FIG. 1) associated with the video frame (e.g., the frame 118, as discussed above with reference to FIG. 1) to the execute device(s) 218.

Although individual ones of the timing device(s) 212 may be utilized to drive, to corresponding execute device(s) 218, groups of video data generated by four cameras, as discussed above in the current disclosure, it is not limited as such. In some examples, any number of one or more groups of video data may be driven out of any number of the timing device(s) 212 and to any number of the execute device(s) 218.

In various implementations, any of the device(s) of the simulation environment can include one or more timers of various types. The timer(s) can include one or more clocks (e.g., one or more hardware clocks), one or more oscillators (e.g., one or more hardware oscillators), and/or one or more of any other types of timers. In some examples, the data retrieval device 208, the data routing device 210, the simulation device 216, and/or one or more other devices, can include, and/or operate utilizing, the primary timer 206.

The primary timer 206 can include various types of timers. For instance, the primary timer 206 can include a world clock, a system clock, etc., or any combination thereof. The primary timer 206 may be accurate to a degree of time (e.g., one second) within a level of accuracy that is greater than a threshold level.

Although the primary timer 206 may be accurate to the degree of time, which may include one second, as discussed above in the current disclosure, it is not limited as such. In some examples, the primary timer 206 may be accurate to any degree of time, such as one nanosecond, one microsecond, one millisecond, or any other degree of time.

Although the primary timer 206 may be accurate to the level of accuracy that is greater than the threshold level, as discussed above in the current disclosure, it is not limited as such. In some examples, the threshold level includes 0.01%, 0.1%, 1%, or any other threshold level.

The primary management device 204 can initiate the simulation by transmitting one or more signals to one or more other devices of the simulation environment. For example, the primary management device 204 can initiate the simulation by transmitting the signal(s) to the data retrieval device 208, the simulation device 216, and/or one or more devices of any type in the simulation environment. The signal(s) can include an initiate and/or start signal, and/or simulation data (e.g., video data and/or control data utilized to perform a simulation).

In some examples, the data retrieval device 208 can be utilized to retrieve the video data 106. For example, the video data 106 can be stored in, and retrieved from, the data storage 202. In some examples, the data retrieval device 208 can retrieve the video data 106 by transmitting one or more signals (e.g., request(s)) to the data storage 202. In those or other examples, the data retrieval device 208, which can include, and/or be communicatively coupled to the data storage 202, can obtain the video data 106 without exchanging the signal(s). For instance, the data retrieval device 208 can utilize access to the data storage 202 to manage (e.g., identify, determine, generate, modify, store, update, delete, communicate, etc.) the video data 106 in any way.

In some examples, the data retrieval device 208 may parse and/or split the video data 106, and/or extract any of the frame(s) from the video data 106. In some examples, one or more operations of the data retrieval device 208 can include generating an adjusted timestamp (e.g., the second timestamp 130, as discussed above with respect to FIG. 1). In alternative or additional examples, the adjusted timestamp (e.g., the second timestamp 130) can be generated by one or more other devices (e.g., the primary management device 204).

The data retrieval device 208 and the data routing device 210 can perform one or more operations and/or exchange one or more signals. The signal(s) exchanged between the data retrieval device 208 and the data routing device 210 can include the video data 106. In some examples, the data retrieval device 208 can include a logical device. In those or other examples, the data retrieval device 208 can perform video parsing, such as decoding of a number of data streams of the video data. In various cases, the data routing device 210 being illustrated by a dotted line may represent the data routing device 210 being utilized to control and/or to route the video data from the data retrieval device 208 and to the timing device(s) 212.

Although the system 200 can include the data retrieval device 208 and the data routing device 210, as discussed above in the current disclosure, it is not limited as such. In various examples, any of the devices of system 200 (e.g., the data retrieval device 208 and the data routing device 210) may be implemented separately or as a single device (e.g., integrated as a single device). In those or other examples, individual ones of the data retrieval device 208 and the data routing device 210 may be, and/or include, hardware components (e.g., physical components) or software components.

The data routing device 210 can manage (e.g., identify, determine, generate, modify, store, update, delete, communicate, etc.) routing of the video data 106. The data routing device 210 can route the video data 106 from the data retrieval device 208 and to the timing device 212.

In some examples, a propagation time (e.g., the propagation time 128, as discussed above with reference to FIG. 1), such as 1/30 seconds, 1/60 seconds, etc., can be utilized as the time to propagate the frame. The propagation time 128 can represent a capability of the data routing device 210 to dispatch video data on a clock boundary and to the timing device 212. The video data that can be routed through the data routing device 210 and to the timing device 212. The video data can be then dispatched by the timing device 212.

In various examples, individual ones of the frame(s) may be associated with corresponding one or more corresponding timestamps of the video data 106. For instance, the frame(s) may include a frame (e.g., an individual frame), such as the frame 118, as discussed above with respect to FIG. 1. The frame 118 may be associated with one or more timestamps, such as the first timestamp 120 and the second timestamp 130, as discussed above with respect to FIG. 1.

In various examples, the second timestamp 130 can be determined by determining a difference between a simulation time (e.g., the $Time_{Simulation}$, as discussed below) and an original log start time (e.g., the $Time_{Old}$, as discussed below) (e.g., a time at which the video data originally captured by the vehicle controller is stored and/or logged), and adding the difference to the first timestamp 120 to determine the second timestamp 130. The simulation time may be derived using an adjustment factor (e.g., the $Time_{Adjustment}$, as discussed below). The adjustment factor (e.g., the $Time_{Adjustment}$) may be determined based on a delay between the data routing device 210 and the timing device 212. For instance, the second timestamp 130 can be generated according to an equation 1, shown below:

$$Timestamp_{New} = Timestamp_{Old} + Time_{Delta} \quad (1)$$

where $Timestamp_{New}$ may be generated as the second timestamp 130, $Timestamp_{Old}$ may be the first timestamp 120, and $Time_{Delta}$ may be a metric utilized to generate the $Timestamp_{New}$. In some implementations, the second timestamp 130 can be generated by determining a difference between a simulation time and the first timestamp 120. The metric, $Time_{Delta}$, utilized to generate the second timestamp 130, $Timestamp_{New}$, can be generated according to an equation 2, shown below:

$$Time_{Delta} = Time_{Simulation} - Time_{Old} \quad (2)$$

where $Time_{Delta}$ may be the metric utilized to generate the $Timestamp_{New}$, $Time_{Simulation}$ may be a processing time (e.g., a time in the very near future at which a frame with which a timestamp is associated will be processed for a simulation that is being executed) (e.g., the simulation time may include a time that is in the near future, such as within a threshold time of a current time, and that is derived using an adjustment factor, as discussed below), $Time_{Old}$ may be an original time (e.g., video log start time) with which the first entry of the video log is associated. The $\text{Time}_{Simulation}$ (e.g., a time in the near future) can be derived using an adjustment factor applied on the current time (e.g., $\text{Time}_{Now}$), according to the equation 3, shown below:

$$\text{Time}_{Simulation} = \text{Time}_{Now} + \text{Time}_{Adjustment} \quad (3)$$

where $\text{Time}_{Adjustment}$ may include the time required to process and propagate the video frame to be available for simulation. An adjustment factor can be derived by considering the processing time 126 and the propagation time 128, as in equation 4 shown below:

$$\text{Time}_{Adjustment} = \text{Time}_{Processing} + \text{Time}_{Travel} \quad (4)$$

Where $\text{Time}_{Processing}$ (e.g., a value of (4*0.05)) may define the time required to process video frame 118 and $\text{Time}_{Travel}$ may be a time delay (e.g., a propagation time of 1/45 seconds, 1/90 seconds, 1/120 seconds, etc.). The adjustment time when subtracted from the second timestamp 130 ensures that the frames are processed and propagated to the buffer of the timing device 212 ahead of second timestamp time, for example as described in equation 5 below:

$$\text{Time}_{Adjustment} = (4*0.05) + \text{Time}_{Travel} \quad (5)$$

where, (4*0.05) may be a time (e.g., a delay) associated with how long it takes for four frames to be driven from the buffer based on a single frame taking 0.05 seconds to be driven from the buffer. The time value (4*0.05) may correspond to a time at which a frame can be driven.

Although the value of (4*0.05) may correspond to a time at which a frame can be driven earlier to the timing device 212, relative to the internal timer 138, as discussed above in the current disclosure, it is not limited as such. In various examples, frames may be driven from the buffer faster than the 0.05 second (e.g., 20 hz) video frequency target. Setting the 20 hz target may ensure that each frame is driven at a start of each 1/20th of a second. A control scheme such as this may work for any frame rate (e.g., not just 20 hz/0.05 seconds per frame. For example, if an original frame rate of a vehicle that is being duplicated during simulation is 30 hz (e.g., instead of 1/20 seconds per frame), 1/30 (e.g., 0.03333) may be utilized instead of 0.05 to calculate the $\text{Time}_{Delta}$.

The $\text{Time}_{Simulation}$, for example, may be a time at which the frame is to be delivered to a test system (e.g., the simulation device 216). During the simulation, a video associated with the video data 106 is played and individual ones of all of the frame(s) of the video are advanced into a current time.

In some cases, the ($\text{Time}_{Simulation} - \text{Time}_{Old}$) can be determined as the difference between the simulation time and the first timestamp 120. In those cases or other cases, the value of (4*0.05) can be determined as the processing time 126, and the $\text{Time}_{Travel}$ can be determined as the propagation time 128. In various examples, the propagation time 128 can include a delay between the data retrieval device 208 and the execute device 218 (e.g., a delay between the data routing device 210 and the timing device 212).

In various examples, some types of hardware and/or some types of systems do not buffer (e.g., propagate) data in the real world instantaneously. Due to some hardware and/or some systems not buffering (e.g., propagating) data instantaneously, there may be one or more delays associated with the frame(s) being propagated from the data storage 202 and to the simulation device 216. The frame(s), for example, may be stored internally in the timing device(s) 212 (e.g., stored in the buffer(s) of the timing device(s) 212) and driven out of the timing device(s) 212 and to the execute device(s) 218, resulting in delay(s) of availability of the frame(s) for simulation by the simulation device 216. The $\text{Time}_{Delta}$, for instance, may be utilized to ensure that the frame(s) are driven out of the buffer and to the test system at the correct time.

In some examples, an amount of time required for the frame(s) to be propagated from the data storage 202 and to the execute device(s) 218 and/or the simulation device 216, may be greater than zero. The frame(s) not being propagated instantaneously may be due to the frame(s) being driven out to one or more connections (e.g., one or more serial connections) between the timing device(s) 212 and the execute device(s) 218, for example.

Individual ones of the timing device(s) 212 include corresponding updated timers, which can include an updated timer 214; and individual ones of the execute device(s) 218 can include corresponding updated timers, which can include an updated timer 224. In various implementations, the timing device(s) 212, the execute device(s) 218, the response device 220, and/or any of the other device(s) of the simulation environment can operate utilizing, one or more of various types of timers. For instance, the timer(s) being managed, and/or utilized for operation of, the timing device(s) 212, the execute device(s) 218, and/or any of the other device(s) can include one or more internal timers. In such an instance, the internal timer(s) can include the internal timer 138, as discussed above with reference to FIG. 1. In such an instance, the internal timer(s) can include the updated timer 140 (e.g., the updated timer 214, the updated timer 224, any other updated timer, etc., or any combination thereof) that may be based on the primary timer, as discussed above with reference to FIGS. 1 and 2.

The $\text{Time}_{Delta}$ may be utilized to ensure that simulations reproduce, on an exact level (e.g., a pseudo-exact level), operation of the vehicle from which the video data 106 is retrieved. The $\text{Time}_{Delta}$ may be utilized to ensure that simulations reproduce, on a level being less than a threshold level, operation of the vehicle from which the video data 106. The $\text{Time}_{Delta}$ may be utilized to ensure that simulation times during playback are as close to exact as possible relative to times of frames captured by sensors of the vehicle. The $\text{Time}_{Delta}$, for instance, may be utilized to ensure that the frame(s) have a large enough amount of time to propagate for execution of the simulation, notwithstanding delays of propagation. The $\text{Time}_{Delta}$, for instance, may be utilized to ensure that the frame(s) of the video data 106 have a large enough amount of time to be driven to the execute device(s) 218 and/or the simulation device 216 at the correct time.

In various examples, the updated timer 140 can be generated based on a counter, which in turn can be generated according to an equation 6, shown below:

$$\text{Counter} = \text{abs}\left(\frac{1,000,000-}{(1,000,00-\text{Number}_{Timesteps})}\right) \quad (6)$$

where Counter may be a number of timesteps for a counter according to which the updated timer 140 skips or inserts a timestep, and $\text{Number}_{Timesteps}$ may be a number of timesteps between signals (e.g., seconds) of the primary timer 206.

Although the Counter may be identified based on a value of 1,000,000, such as for microsecond (μS) accuracy, as discussed above in the current disclosure, it is not limited as such. In various examples, this same concept may apply if a level of accuracy desired is more (e.g., a level of accuracy corresponding to a greater number of timesteps) or less (e.g., a level of accuracy corresponding to a fewer number of timesteps). For instance, extending this concept to, for instance, nanosecond (ηS) accuracy, a value of 1e9 (1,000,000,000) may be utilized instead of 1,000,000.

The internal timer 138 and the primary timer 206 can be utilized to generate the updated timer 140. In some instances, the internal timer 138 may include a number of timesteps allocated to be utilized for the updated timer 140, notwithstanding the primary timer 206 varying with respect to the amount of time between the signals (e.g., the seconds). In various examples, the internal timer 138 can be updated based on variations of the internal timer 138 over time. For example, based on a number of timesteps in a cycle of the internal timer 138, the internal timer 138 can be updated to be the updated timer 140 by skipping timesteps in subsequent cycles the updated timer 140. Skipping the timesteps can include advancing to a subsequent timestep of a skipped timestep.

In a hypothetical example, the $Number_{Timesteps}$ for the internal timer 138 may include 999,992 clocks ticks per second, which indicates that the internal timer 138 is to be updated to make up for 8 microseconds that are missing from the timesteps of the primary timer 206. The 8 microseconds may be missing due to the internal timer 138 running slow with respect to a predetermined number and of timesteps and/or a threshold number of timesteps, which may equal 100,000,000. To update the internal timer 138 to be the updated timer 140, at a beginning of a signal (e.g., a second), a counter is set to equal 125,000. As the primary timer 206 and the updated timer 140 run, the counter is decremented at each timestep (e.g., each microsecond) of the updated timer 140.

In the hypothetical example, when a value of the counter is equal to 0, the updated timer 140 is updated to have a skipped timestep. The updated timer 140, when the value of the counter is equal to 0, is updated to be incremented by two timesteps instead of a single timestep. The counter is reset to 125,000 and continues to be decremented in a similar way as for initial operation of the updated timer 140. The updated timer 140 is updated at each timestep of subsequent timesteps associated with subsequent values of the counter being equal to zero, in a similar way as for the skipped timestep. By skipping timesteps, the updated timer 140 at each signal (e.g., second) of the primary timer 206, will have an equal value as for the primary timer 206. By skipping timesteps, the updated timer 140 at each signal (e.g., a first second) of the primary timer 206, may be incremented to a have a value of a subsequent second (e.g., a second second). At the end of the timesteps of the updated timer 140 for a one second period, a total number of timesteps between two consecutive seconds of the updated timer 140 will be less than 1,000,000. At the end of the timesteps of the updated timer 140 for a one second period, a value of the updated timer 140 may be greater than 1,000,000. At the end of the timesteps of the updated timer 140 for a cycle with a time period of one second, a value of the updated timer 140 may be 1,000,008, or any other value resulting from the skipped timesteps.

In the hypothetical example, the updated timer 140 and the primary timer 206 may be incremented at each second at a same time. The updated timer 140 may be incremented at each second at the same time and with a level of accuracy that is greater than a threshold level of accuracy (e.g., 99.9% accuracy, 99.99% accuracy, 99.999% accuracy, 99.9999% accuracy, 99.99999% accuracy, etc.). The updated timer 140 may be incremented at each same time and with a level of error that is less than a threshold level of error (e.g., 0.1% error, 0.01% error, 0.001% error, 0.0001% error, 0.00001% error, 0.000001% error, 0.0000001% error, etc.).

In the hypothetical example, the internal timer 138 may be updated to be the updated timer 140 based on the primary timer 206 to compensate for hardware imperfections and/or vulnerabilities and/or operational changes of the internal timer 138. The internal timer 138 may be updated to be the updated timer 140 to compensate for the internal timer 138 changing how many timesteps occur between seconds of the primary timer 206, over time. The internal timer 138 may be updated to be the updated timer 140 to compensate for the internal timer 138, after a period of time, experiencing changes in electrical performance and/or characteristics. For example, the internal timer 138 may heat up, which may cause the number of timesteps between the signals of the internal timer 138, which may correspond to signals of the primary timer 206, to change.

In the hypothetical example, the number of timesteps can be identified at any time, and/or repeatedly for any number of times to update any of the internal timer(s) (e.g., the updated timer 140), in a similar way as discussed above. The updated timer 140 may skip periodic timesteps for a number of skipped timesteps for a number of cycles of the primary timer 206. Subsequently, the updated timer 140 may skip periodic timesteps for a different number of skipped timesteps for another group of cycles of the primary timer 206, and so on.

The period of time and/or number of timesteps between the skipped timesteps may vary based on different results being generated utilizing the equation 6 at different points in time during operation of the simulation device 216. For example, any number of timesteps for the updated timer 140 for any cycle of the primary timer 206 may be determined based on leap ticks (e.g., ticks/timesteps that are added)/fall ticks (e.g., ticks/timesteps that are removed). The number of timesteps for the updated timer 140 for any cycle of the primary timer 206, based on the leap/fall ticks, may be different from any other cycles of the primary timer 206.

Although the updated timer 140 may skip timesteps, as discussed above in the current disclosure, it is not limited as such. In some examples, the updated timer 140 may include timesteps being inserted periodically between signals in a similar way as for the skipped timesteps, as discussed above.

In a hypothetical example, if the internal timer 138 is running too fast, the counter may be calculated utilizing the equation 6 to be more than 1,000,000 timesteps per second. For instance, the equation 6 is calculated based on the $Number_{Timesteps}$ being greater than 1,000,000. The number of individual timesteps (e.g., the $Number_{Timesteps}$) between receiving a first signal of the primary timer (e.g., the primary clock) and a second signal from the primary clock can be identified (e.g., counted). The internal timer 138 can be updated based on the number of individual timesteps. As a result of the $Number_{Timesteps}$ being greater than 1,000,000, the counter for the updated timer 140 is decremented at each timestep as the updated timer 140 runs. When the counter is decremented to have a value of zero, the timesteps of the updated timer 140 are not incremented. To step the updated timer 140 back a single timestep, a value of zero is added to the timesteps of the updated timer 140 (e.g., instead of a value of 1, for previous timesteps). The counter is then reset and the counter continues to run for updating the updated timer 140 at each of subsequent timesteps when subsequent values of the counter are equal to zero. At the end of the timesteps of the updated timer 140 for a one second period, a total number of timesteps between two consecutive seconds of the updated timer 140 will be greater than 1,000,000.

At the end of the timesteps of the updated timer 140 for a one second period, a value of the updated timer 140 may be less than 1,000,000. At the end of the timesteps of the updated timer 140 for a one second period, a value of the updated timer 140 may be 0.999999, 0.999998, etc.

Although a number of timesteps (e.g., microseconds) between the signals (e.g., seconds) may be utilized for the internal timer 138 and/or the updated timer 140, as discussed above in the current disclosure, it is not limited as such. In some examples, any types of any number of timesteps may be utilized for the internal timer 138 and/or the updated timer 140. In those or other examples, any types of any number of timesteps (e.g., nanoseconds, milliseconds, etc.) between signals of any types may be utilized for the internal timer 138 and/or the updated timer 140.

The internal timer 138 may be utilized to generate the updated timer 140 to ensure accuracy and precision of the updated timer 140. Because drift or noise in primary timers (e.g., system hardware clocks) is rare and minimal, primary hardware clocks tend to be stable even if they are not accurate to less than an accuracy threshold (e.g., not having accuracy to less than one second). To ensure both accuracy and precision of the updated timer 140, calculations utilizing the equation 6 to generate the updated timer 140 may be performed at every cycle (e.g., at every signal) of the primary timer 206. A rolling average of the results of the equation 6 can be calculated and utilized to ensure that the internal timer(s) (e.g., the updated timer 140) remain aligned with the primary timer 206 (e.g., such as by using internal hardware oscillators as the internal timer(s)).

The data routing device 210 and the timing device(s) 212 can perform one or more operations and/or exchange one or more signals. In some examples, the signal(s) exchanged between the data retrieval device 208 and the data routing device 210 can include the video data 106. In those or other example, the signal(s) exchanged between the data retrieval device 208 and the data routing device 210 can include at least one of the frame(s) of the video data 106. For instance, a number of the frame(s) communicated between the data routing device 210 and the timing device(s) 212 can be greater than a threshold, and/or less than a threshold (e.g., a same or different threshold). In such an instance, the number of the frame(s) can include four frames.

The second timestamp 130 and the updated timer 140 can be generated to improve simulations. In various implementations, the second timestamp 130 being generated, such as by utilizing the equations 1-5, and the updated timer 140 being generated, such as by utilizing the equation 6, the timing device(s) 212 can be utilized to drive the frame(s) of the video data 106, such as the frame 118, out of the buffer and to the simulation device 216, via the execute device(s) 218.

The timing device(s) 212 can store the frame(s) in various ways. In some examples, the timing device(s) 212 can include, and/or be communicatively coupled to, one or more buffers of any number. For instance, a number of the buffer(s) may be the same as the number of frame(s), greater than a threshold, and/or less than a threshold (e.g., a same or different threshold). The number of frame(s) may correspond to the number of the buffer(s). In such an instance, the number of the buffer(s) can include four buffers.

In various implementations, the number of the frame(s) and/or the number of the buffer(s) may be determined in various ways, such as with the number of the frame(s) and/or the number of the buffer(s) being determined empirically. The number of frame(s) and/or the number of the buffer(s) may be determined based on system configurations, constraints, performance attributes, costs (e.g., associated with one or more deviations and/or one or more errors), etc.

Although the number of the frame(s) and the number of the buffer(s) may include four frames and four buffers, as discussed above in the current disclosure, it is not limited as such. In various examples, the number of the frame(s) and/or the number of the buffer(s) may include any number of frames and/or any number of buffers, respectively.

The timing device(s) 212 and/or a validation device (e.g., the simulation device 216, the response device 220, one or more other devices of the system 200 and/or another system, or any combination thereof) can perform one or more operations and/or exchange one or more signals. For example, the operation(s) can be performed, and/or the signal(s) can be exchanged, by the timing device(s) 212, the simulation device 216, the execute device(s) 218, and/or the response device 220. In some examples, the signal(s) exchanged between the timing device(s) 212, the execute device(s) 218, and/or the response device 220 can include the video data 106. In those or other examples, the signal(s) exchanged between the timing device(s) 212, the simulation device 216, the execute device(s) 218, and/or the response device 220 can include at least one of the frame(s) of the video data 106.

For instance, a number of the frame(s) communicated between the timing device(s) 212 and/or the execute device(s) 218 can be greater than a threshold, and/or less than a threshold (e.g., a same or different threshold). In such an instance, the number of the frame(s) can include one frame. For example, the timing device(s) 212 can output the frame(s) of the video data 106 sequentially and/or consecutively, from the buffer(s). The frame(s) can be sequentially and/or consecutively propagated from a last buffer (e.g., a fourth buffer) to a first buffer (e.g., a first buffer), in a same order according to how the frame(s) are received.

The timing device(s) 212 can be utilized to drive the frame(s) of the video data 106 out of the buffer(s) and to the execute device(s) 218, to enable the frame(s) to be utilized by the simulation device 216 for performing the simulation. Any of the frame(s) in the first buffer can be driven out of the first buffer and to the execute device(s) 218, based on the operation(s) of the timing device(s) 212.

The simulation device 216 can be utilized to manage (e.g., identify, determine, generate, modify, store, update, delete, communicate, etc.) response data 222 as output of the execute device(s) 218. For example, the signal(s) exchanged utilizing the execute device(s) 218 and/or the response device 220 can include the response data 222.

In various implementations, the simulation device 216 can utilize the execute device(s) 218 to perform the simulation and to manage the response data 222 by utilizing the response device 220. For example, the response data 222 can include data identifying, and/or including one or more identifiers associated with, one or more corresponding responses of one or more vehicle controllers (e.g., one or more vehicle control systems) based on the simulation being performed.

Although the response data 222 can include data associated with the response(s), as discussed above in the current disclosure, it is not limited as such. In some examples, the response data 222 can include validation data identifying, and/or including one or more identifiers associated with, any corresponding response identifier(s) being validated. The validation data, for example, can indicate whether the control system(s) operate within one or more thresholds, perform one or more predicated operations within one or more tolerance thresholds, or any combination thereof.

Although the data storage 202, the primary management device 204, the data retrieval device 208, the data routing device 210, the timing device(s) 212, the simulation device 216, the execute device(s) 218, the response device 220, and/or the other device(s) of various types may be individual and separate devices with respect to one another, as discussed above in the current disclosure, it is not limited as such. In some examples, at least one of any of the data storage 202, the primary management device 204, the data retrieval device 208, the data routing device 210, the timing device(s) 212, the simulation device 216, the execute device(s) 218, the response device 220, and/or the other device(s) of various types, may be integrated with one another, combined together, or implemented, arranged, or managed in any other way, or any combination thereof.

Although various devices may be utilized to generate various types of data (e.g., the second timestamp 130) and/or various timers (e.g., the updated timer 140), as discussed above in the current disclosure, it is not limited as such. In some examples, any of the device(s) of the system 200 may be utilized to generate any of the data and/or any of the various timers utilized to perform simulations based on the video data 106.

In a hypothetical example, one or more groups of video data, including the video data 106, may be retrieved from the data storage 110. The data, which may include the video data 106, may be ingested from the vehicle. Individual ones of the groups of video data may be associated with corresponding cameras. Multiple groups of video data need to be synchronized during simulations as exactly as possible with respect to how the vehicle processed the video data in the real word. The adjusted timestamps and the updated timers can be utilized to improve accuracy of the simulations, in contrast to existing systems that may be unable to preserve, for purposes of performing simulations, real-world jitter and/or imperfections experienced during processing of video data while vehicle are in operation.

In the hypothetical example, imperfections may be present for data passing through different locations of vehicle systems. Additionally or alternatively, imperfections may also occur in different ways between data for different sensors of the same, or different, types. By utilizing the system 200, the imperfections may be preserved accurately during simulations to effectively test vehicle systems to a greater degree than in existing systems. The simulation systems according to the techniques discussed herein enable vehicle systems to be updated based on simulations to improve safety of the vehicles. In various examples, the sensor data (e.g., the video data) can be synchronized with one or more of any of the other types (or "modalities") of sensor data and utilized for the simulations. In those or other examples, the other types of sensor data can be processed in a similar way as for the video data for purposes of implementing any of the techniques discussed herein.

Although the timing device(s) 212 may include multiple timing devices, and the execute device(s) 218 may include multiple execute devices, as discussed above for the current disclosure, it is not limited as such. In some examples, individual ones of the timing device(s) 212 and/or individual ones of the execute device(s) 218 may be implemented and/or utilized for different corresponding groups of video data, for data associated with different corresponding sensors, for different corresponding types of data, for data associated with different corresponding vehicles, any other types of data, or any combination thereof. In some examples, the timing device(s) 212 may be implemented as a single timing device.

In some examples, the execute device(s) 218 may be implemented as a single execute device.

Although the timing device(s) 212 and the execute device(s) 218 include the updated timer 140 as discussed above in the current disclosure, it is not limited as such. In examples, the timing device(s) 212 and the execute device(s) 218 include the same internal timer. In other examples, the timing device(s) 212 and the execute device(s) 218 include different internal timers. In those or other examples, the different internal timers may be implemented in a similar way as, or different way from, the updated timer 140.

Figure 3:
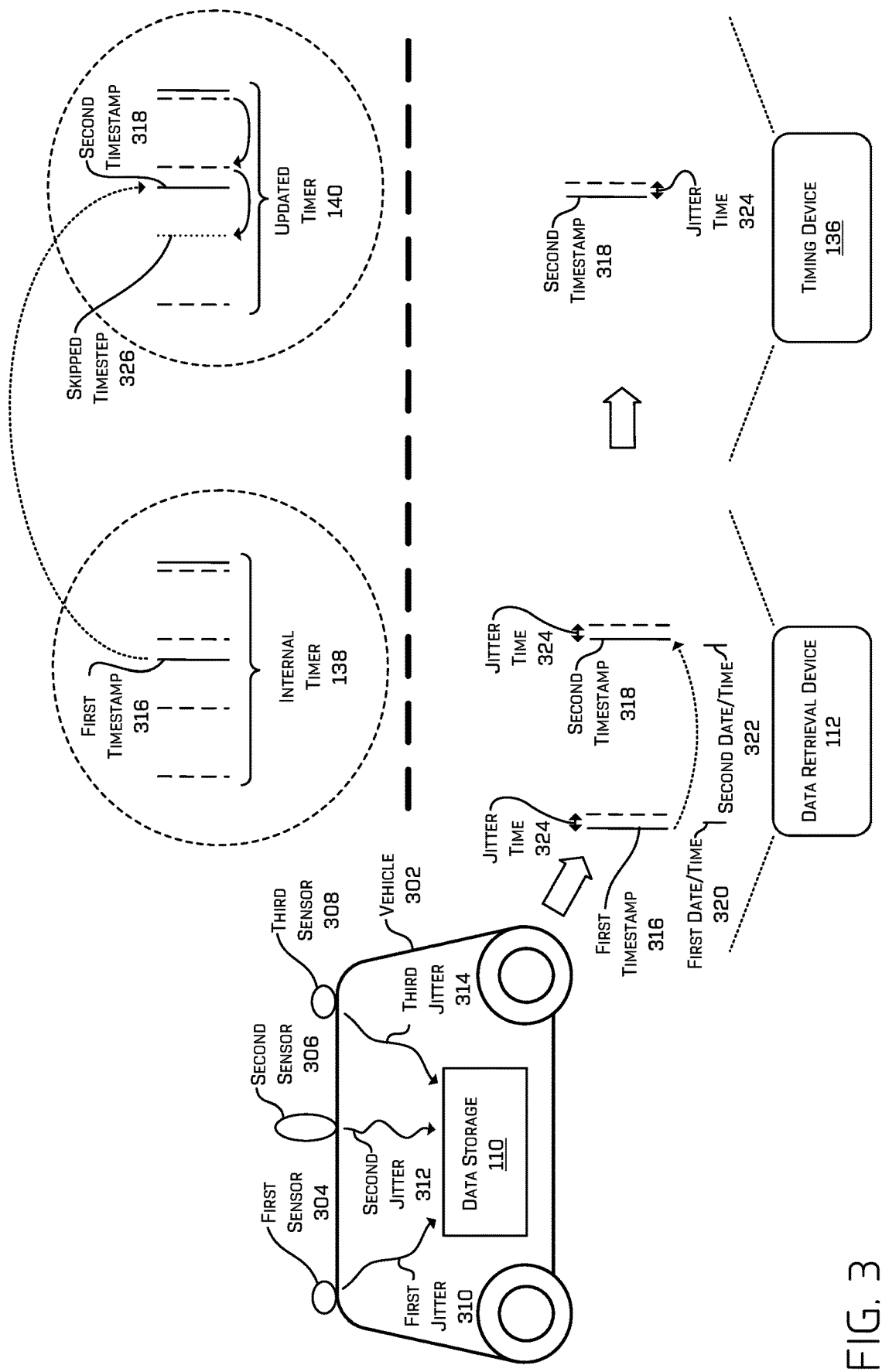
FIG. 3 are example adjusted timestamps and example updated timers for performing simulations, in accordance with one or more examples of the disclosure.

FIG. 3 are example adjusted timestamps and example updated timers for performing simulations, in accordance with one or more examples of the disclosure. In some examples, a vehicle 302 can be utilized to implement the vehicle, and/or for simulation of a vehicle environment associated with the process 100, as discussed above with reference to FIG. 1. By utilizing one or more devices being implemented according to the techniques discussed herein, a simulation can be performed by updating one or more timestamps of, and/or by controlling one or more internal timers accurately and precisely to drive, one or more video data frames. The timestamp(s) can be adjusted, and/or the internal timer(s) can be controlled accurately and precisely, for the video data frame(s), which can be generated by one or more sensors of the vehicle 302. For instance, the simulation can be performed accurately and precisely to reproduce the data, which can include video data, such as the video data 106, as discussed above with reference to FIG. 1. In such an instance or another instance, the simulation can be performed accurately and precisely to reproduce the video data 106, including jitter associated with any of the video data 106.

The adjusting of the timestamp(s) and/or the updating the timer(s) may increase the effectiveness of the simulation, in contrast to existing systems that may have insufficiently managed timestamps and/or timers. According to the techniques discussed herein, any minute aspects related to how and/or when data is generated may be reproduced during simulations exactly, within an error range below a threshold error range. Even extremely small variations between how timestamps are managed and/or how timers are used to drive frames based on the timestamps during simulations play an important part in ensuring correct vehicle responsiveness in various driving scenarios. The simulations according to the techniques discussed herein enable the simulation environment to test vehicle systems precisely and accurately.

In various implementations, the vehicle 302 can include the sensor(s), which may be of various types. For example, the sensor(s) of the vehicle 302 can include one or more of a first sensor 304, a second sensor 306, a third sensor 308, and/or one or more of other sensors of various types. The sensors(s) of the vehicle 302 may be the same types as, or different types from, one another. In some examples, the first sensor 304 may be a different type from the second sensor 306. In those or other examples, the first sensor 304 and the third sensor 308 may be the same type as one another. For instance, the first sensor 304 can include a video sensor (e.g., a camera). In such an instance or another instance, the second sensor 306 can include a lidar sensor. In such an instance or another instance, video data, such as the video data 106, may be generated by one of the sensor(s) of the vehicle 302, such as the first sensor 304.

Various types of jitter may be experienced by any of the sensor(s) of the vehicle 302, one or more communication paths associated therewith, one or more devices associated therewith, data associated therewith, or any combination thereof.

In some examples, the jitter may include first jitter 310 associated with the first sensor(s) 304, second jitter 312 associated with the second sensor 306, and third jitter 314 associated with the third sensor 308. At least one of the first jitter 310, the second jitter 312, and the third jitter 314, may be different from one another. The variations between the first jitter 310, the second jitter 312, and the third jitter 314 may result in at least one offset associated with individual timestamps associated with the first sensor, the second sensor 306, and the third sensor 308 being offset from predicted timestamps.

Various timestamps may be offset in different ways from other timestamps. In some examples, a timestamp associated with an individual sensor, such as the first sensor 304, may be offset and/or experience jitter of different amounts than another timestamp associated with the first sensor 304. In those or other examples, a timestamp associated with an individual sensor, such as the first sensor 304, may be offset and/or experience jitter of different amounts than another timestamp associated with another sensor of the different type, such as the second sensor 306. In those or other examples, a timestamp associated with an individual sensor, such as the first sensor 304, may be offset and/or experience jitter of different amounts than another timestamp associated with another sensor of the same type, such as the second sensor 306.

In various implementations, variations associated with the device(s) of the vehicle 302 may result in jitter associated with various ones of the sensor(s) of the vehicle 302 being different from one another. For examples, variations in design, manufacturing, assembly, operation, or any combination thereof, may affect jitter. In some instances, variations in operation time, current activation/operation length, current runtime, overall usage time, lifespan, longevity, durability, degradation, wear, malfunctions, electrical interference, electrical noise, etc., or any combination thereof may affect jitter. Jitter may affect variations in timing of a single device at devices times, variations in timing of data at different locations of a device/system as the data propagates through the device/system, variations between timing of different devices, one or more other variations of other types, or any combination thereof.

In some examples, the video data 106 can include a first frame, and a first timestamp 316 associated with the first frame. In those or other examples, a second timestamp 318 associated with the first frame can be identified based on the first timestamp. In various examples, the first frame, the first timestamp 316, and the second timestamp 318 can be utilized to implement the frame 118, the first timestamp 120, and the second timestamp 130, respectively. In various examples, the second timestamp 318 generated by the data retrieval device 112 is utilized by the timing device 136 to output frame(s) based on the updated timer 140. The updated timer 140 is generated by the timing device 136. The frame(s) are output by the timing device 136 and to the execute device 148, based on the second timestamp 318 and the updated timer 140.

The timestamps may be associated with one or more corresponding dates and/or one or more corresponding times. For example, the first timestamp 316 may be associated with a first date/time 320, and the second timestamp 318 may be associated with a second date/time 322. In various examples, the first date/time 320 and the second date/time 322 may be utilized to update the first timestamp 316 to be the second timestamp 318. For instance, the first timestamp 316 associated with the first date/time 320 can be adjusted based on an adjustment factor (or "adjustment time"). In some cases, the first timestamp 316 associated with the first date/time 320 can be adjusted based on a processing time and a propagation time to be the second timestamp 318 associated with the second date/time 322. In such an instance or another instance, the processing time and/or the propagation time can include the processing time 126 and/or the propagation time 128, respectively.

By utilizing the second timestamp 318 and the updated timer 140, any jitter associated with the video data 106 and/or the vehicle 302 can be preserved during the simulation. In various examples, the jitter associated with the video data 106 and/or the vehicle 302 may include various types of jitter, with which one or more jitter times are associated. The jitter time(s) may include a jitter time 324. In some examples, the jitter time 324, with which the first jitter 310 may be associated, may be replicated in the second timestamp 318 generated by the data retrieval device 112. In those or other examples, the jitter time 324, with which the first jitter 310 may be associated, may be replicated in the second timestamp 318 utilized to drive the frame 118 by the timing device 212, out of the buffer, and into the simulation device 216 for ensuring that the simulation utilizes a correct representation of behavior of data being collected in the real world by the vehicle 302.

The video data 106 may include one or more timestamps, which can include the first timestamp 316, the second timestamp 318, and/or one or more other timestamps. For example, the timestamp(s) may be associated with the video data frame(s), respectively, which can include the frame 118 with which the first timestamp 316 and the second timestamp 318 are associated. In such an example or another example, the frame(s) can include a second frame with which one or more other timestamps are associated.

A timing device and an execute device can exchange the video data 106. In some examples, the timing device and/or the execute device can include the timing device 136/212 and/or the execute device 148/218, respectively, as discussed above with reference to FIGS. 1 and 2. In some examples, the timing device 136 can provide, from a buffer of the timing device 136, the frame 118. In those or other examples, the timing device 136 can drive the frame 118 out of the buffer and to a simulation device based on a current time being greater than or equal to the second timestamp 318. For example, the simulation device can include the simulation device 216, as discussed above with reference to FIG. 2.

Individual ones of various timers can include corresponding numbers of timesteps. In some examples, the internal timer 138 can include a number of timesteps (e.g., 1,000,000 timesteps). In those or other examples, the updated timer 140 can include a number of timesteps being greater than, equal to, or less than the number of timesteps of the internal timer 138. By way of example, a number of timesteps of the internal timer 138 can be skipped in the updated timer 140, as discussed above with. In such an example, the timesteps can include a skipped timestep 326 that is replaced by a gap in the timesteps of the updated timer 140. In such an example, the skipped timestep 326 may be substituted by an omission of a timestep in the timesteps of the updated timer 140, the omission including the skipped timestep 326 not being included the updated timer 140.

In some examples, various frames can be driven to the simulation device 216 in various ways based on inclusion or omission of timesteps. For instance, the frame 118 can be driven out of the buffer in the timing device 212 and to the simulation device 216 based on a current time being associated with a timestep of the updated timer 140 succeeding the skipped timestep 326. In such an instance, the frame 118 can be driven based on the current time, which may be associated with the timestep of the updated timer 140 succeeding the skipped timestep 326, being greater than the second timestamp 318.

In some examples, the frame 118 may be output based on the current time, a threshold, and the current timestep of the updated timer 140. In those or other examples, the frame 118 may be output based on a combination of the current time and a threshold (e.g., a threshold time). In those or other examples, the frame 118 may be output based on a difference between the combination and the current timestep of the updated timer 140 being less than a threshold (e.g., a threshold difference).

In some examples, the frame 118 may be dropped based on a difference between the combination and the current timestep of the updated timer 140 being greater than the threshold. In those or other examples, the frame 118 may be dropped based on the difference being greater than the threshold, and based on the frame 118 not being previously driven due to various factors. The factors may include delays (e.g., system delays), one or more other factors, or any combination thereof. The frame 118 not being previously driven out may be correlated to a faulty state (e.g., a faulty system state).

A timestep succeeding one or more skipped timesteps may include the timestep immediately following, and/or being directly adjacent to, the skipped timestep(s), without any intermediate timesteps separating, dividing, or falling between, the skipped timestep(s) and the timestep succeeding the skipped timestep(s). For instance, the skipped timestep(s) may include one or more consecutive and/or nonconsecutive skipped timestep(s). In some examples, the skipped timestep(s) may include the timestep succeeding the skipped timestep 326. In those or other examples, the timestep succeeding the skipped timestep 326 may immediately follow, and/or be directly adjacent to, the skipped timestep 326, without any intermediate timesteps separating, dividing, or falling between, the skipped timestep 326 and the timestep succeeding the skipped timestep 326.

Figure 4:
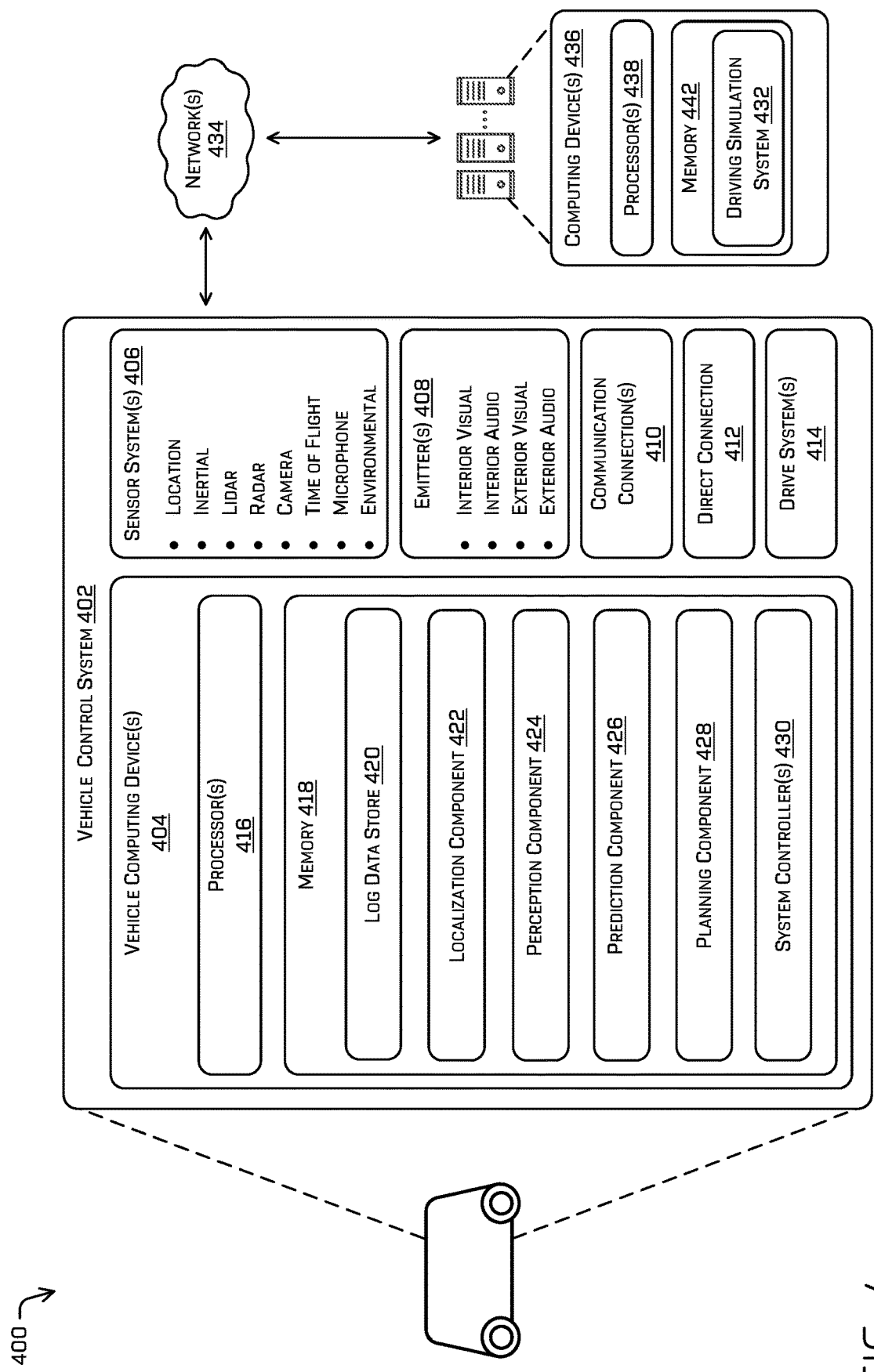
FIG. 4 illustrates an example computing environment that may be used to implement the driving simulation systems, in accordance with one or more examples of the disclosure.

FIG. 4 illustrates an example computing environment 400 that may be used to implement the driving simulation systems, in accordance with one or more examples of the disclosure. The computing environment 400 may include a vehicle control system 402 and one or more computing devices 436. The vehicle control system 402 may include various software-based and/or hardware-based components of an autonomous vehicle, and may be used to control autonomous vehicles traversing through physical environments and/or simulated vehicles operating within virtual and/or log-based simulations.

In this example, the vehicle control system 402 and the computing device(s) 436 and are illustrated as discrete computing systems communicating over one or more networks 434, although in other implementations the functionality of each of the systems 402, the device(s) 436, may be carried out in the same computing environment. By way of non-limiting example, software executing the functionality of the vehicle control system 402 may be uploaded or otherwise incorporated into the computing device(s) 436 and/or software executing the computing device(s) 436 may be uploaded to or otherwise made incorporated into the vehicle control system 402.

The vehicle control system 402 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, the vehicle control system 402 may operate within a real associated vehicle, such as a fully or partially autonomous vehicle having any other level or classification. In some instances, the techniques described herein may be usable by non-autonomous vehicles as well. Additionally or alternatively, the vehicle control system 402 may operate independently from any vehicle, for example, as a hardware and software-based controller for a simulated vehicle executing in a computing environment during the development, testing, and validation processes for the vehicle control system 402. In addition, while implementations of the vehicle control system 402 described herein may include simulating a control system of an autonomous vehicle, semi-autonomous vehicle, or a non-autonomous vehicle, some of the techniques may be in a simulated environment, using a simulated vehicle.

The vehicle control system 402 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle control system 402 can be powered by one or more internal combustion engines, one or more electric motors, hydrogen power, any combination thereof, and/or any other suitable power sources. Although the associated vehicle may have four wheels, the vehicle control system 402 and associated techniques described herein can be incorporated into vehicles having fewer or a greater number of wheels, and/or tires. The vehicle control system 402 can control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

The vehicle control system 402 can include a computing device(s) 404, one or more sensor system(s) 406, one or more emitters 408, one or more communication connections 410 (also referred to as communication devices and/or modems), at least one direct connection 412 (e.g., for physically coupling with the vehicle to exchange data and/or to provide power), and one or more drive systems 414. The one or more sensor systems 406 can be configured to capture sensor data associated with an environment.

The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the real or simulated vehicle associated with the vehicle control system 402. As another example, the camera sensors can include multiple cameras disposed at various locations about the exterior and/or interior of the associated real or simulated vehicle. The sensor system(s) 406 can provide input to the computing device(s) 404.

The vehicle control system 402 can also include one or more emitters 408 for controlling the emitting of light and/or sound via the real or simulated vehicle associated with the vehicle control system 402. The emitter(s) 408 in this example include interior audio and visual emitters to communicate with passengers of the vehicle. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle control system 402 can also include one or more communication connections 410 that enable communication between the vehicle control system 402 and one or more other local or remote computing devices (e.g., a remote teleoperations computing device) or remote services. For instance, the communication connection(s) 410 can facilitate communication with other local computing device(s) on the associated real or simulated vehicle, and/or the drive system(s) 414. Also, the communication connection(s) 410 can allow the vehicle to communicate with other nearby computing device(s) (e.g., other nearby vehicles, traffic signals, etc.).

The communications connection(s) 410 can include physical and/or logical interfaces for connecting the computing device(s) 404 to another computing device or one or more external networks (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s). In at least some examples, the communication connection(s) 410 may comprise the one or more modems as described in detail above.

In at least one example, the vehicle control system 402 can include one or more drive systems 414. In some examples, the real or simulated vehicle associated with the vehicle control system 402 can have a single drive system 414. In at least one example, if the vehicle has multiple drive systems 414, individual drive systems 414 can be positioned on opposite ends of the associated vehicle (e.g., the front and the rear, etc.). In at least one example, the drive system(s) 414 can include one or more sensor systems 406 to detect conditions of the drive system(s) 414 and/or the surroundings of the vehicle. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle control system 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller 430 which can receive and preprocess data from the sensor system(s) 406 and to control operation of the various vehicle systems. In some examples, the drive system controller can include one or more processors and memory communicatively coupled with the processor(s). The memory can store one or more modules to perform various functionalities of the drive system(s) 414. Furthermore, the drive system(s) 414 also includes one or more communication connections that enable communication by the respective drive system with one or more other local or remote computing device(s).

The computing device(s) 404 within the vehicle control system 402 can include one or more processors 416 and memory 418 communicatively coupled with the processor(s) 416. In the illustrated example, the memory 418 of the vehicle computing device(s) 404 includes log data store 420, a localization component 422, a perception component 424, a prediction component 426, a planning component 428, and one or more system controllers 430. Though depicted as residing in the memory 418 for illustrative purposes, it is contemplated that the localization component 422, the perception component 424, the prediction component 426, the planning component 428, and the system controller(s) 430 can additionally, or alternatively, be accessible to the computing device(s) 404 (e.g., stored in a different component of vehicle control system 402 and/or stored remotely and accessible to the vehicle control system 402).

The log data store 420 can include map data, vehicle type, software version, vehicle positions, vehicle velocities, vehicle accelerations, or the like over time during the course of individual trips. In some examples, the log data store 420 can further include raw sensor data and/or data based on sensor data detected at the plurality of vehicles, for example, data identifying characteristics of the environment in which a vehicle was operated, objects within the proximity of the vehicle, attributes or characteristics of the environment and objects (e.g., classifications, sizes, shapes, positions, trajectories, etc.).

The localization component 422 can include functionality to receive data from the sensor system(s) 406 to determine a position of the real vehicle associated with the vehicle control system 402. For example, the localization component 422 can include and/or request/receive a three-dimensional map of the real environment and can continuously determine a location of the autonomous vehicle within the map. In some instances, the localization component 422 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle.

The perception component 424 can include functionality to perform object detection, sensor, fusion, (e.g., associating vision data, lidar data, radar data, etc. whereby the sensor data represents the same (or a portion of) an object or field of view), segmentation, and/or classification. In some examples, the perception component 424 can provide processed sensor data that indicates a presence of an entity that is proximate to the real or simulated vehicle associated with the vehicle control system 402 and/or a classification of the entity as an entity type (e.g., car, pedestrian, cyclist, building, tree, road surface, curb, sidewalk, unknown, etc.). In additional and/or alternative examples, the perception component 424 can provide processed sensor data that indicates one or more characteristics associated with a detected entity and/or the real or simulated environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The prediction component 426 can receive sensor data from the sensor system(s) 406, map data, and/or perception data output from the perception component 424 (e.g., processed sensor data), and can output predictions associated with one or more objects within the environment of the autonomous vehicle. Predictions can include predicted trajectories associated with objects in the environment in which the autonomous vehicle is operating.

The planning component 428 can determine a path for the vehicle control system 402 to direct the real vehicle through a real environment. For example, the planning component 428 can determine various routes and paths and various levels of detail. In some instances, the planning component 428 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 428 can generate an instruction for guiding the autonomous vehicle along at least a portion of the route from the first location to the second location. In at least one example, the planning component 428 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 428 can alternatively, or additionally, use data from the perception component 424 to determine a path for the real vehicle associated with the vehicle control system 402 to follow to traverse through an environment. For example, the planning component 428 can receive data from the perception component 424 regarding objects associated with an environment. Using this data, the planning component 428 can determine a route to travel from a first location (e.g., a current location) to a second location (e.g., a target location) to avoid objects in an environment. In at least some examples, such a planning component 428 may determine there is no such collision free path and, in turn, provide a path which brings the vehicle to a safe stop avoiding all collisions and/or otherwise mitigating damage.

The computing device(s) 436 can receive log data from the vehicle control system 402 and drive simulations based at least in part on the log data. Although not shown in this example, the computing device(s) 436 also may include log data store(s) similar or identical to the log data store 420. The computing device(s) 436 may include one or more processors 438 and memory 442 communicatively coupled with the one or more processors 438. In the illustrated example, the memory 442 of the computing device(s) 436 stores a driving simulation system 432. In some implementations, the driving simulation system 432 may be utilized to implement any of the device(s) and/or system(s) utilized to perform the simulation(s), as discussed above with reference to FIGS. 1-3.

In some examples, one or more type of data of any type, including the log data, timestamp data, the video data 106, adjusted timestamp data, etc., or any combination thereof, can be utilized to perform the simulation(s). In those or other examples, the adjusted timestamp(s) can include the second timestamp 130. In those examples, the log data can include any data being processed by utilizing the updated timer(s) (e.g., the updated timer 140) to perform the simulation(s) based on the video data 106. The timestamp data can include one or more timestamps (e.g., the first timestamp 316) captured by the vehicle. The adjusted timestamp data can include one or more adjusted timestamps (e.g., the second timestamp 318) corresponding to, and/or generated based on, the captured timestamp(s), respectively.

In some examples, the log data can include trajectories associated with a plurality of vehicles with various software versions and/or various vehicle types. To generate driving simulations for a simulated vehicle, the driving simulation system 432 can determine one or more trajectories from the plurality of vehicle trajectories based on vehicle data associated with a simulated vehicle. Examples of vehicle data can include, but are not limited to, first data indicating a software version associated with the simulated vehicle, second data indicating a vehicle type associated with the simulated vehicle. For example, the driving simulation system 432 can filter the log data to determine one or more trajectories for a real vehicle based on the software version and/or the vehicle type associated with simulated vehicle, where the real vehicle is associated with the same software version and/or the same vehicle type as the simulated vehicle.

The driving simulation system 432 can further control a simulated vehicle based at least in part on the log data, where the simulated vehicle follows a simulation trajectory in a simulated environment. In some examples, the simulated vehicle can follow the simulation trajectory corresponding to the previous trajectory(ies) for the real vehicle.

The processor(s) 416 of the computing device(s) 404 and the processor(s) 438 of the simulation system 432 can be any suitable processor capable of executing instructions to process data and perform operations as described herein. By way of example and not limitation, the processor(s) 416 and 438 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 of the computing device(s) 404, and the memory 442 of the simulation system 432 are examples of non-transitory computer-readable media. The memory 418 and 442 can store an operating system and one or more software applications, instructions, programs, and/or data to implement the methods described herein and the functions attributed to the various systems. In various implementations, the memory 418 and 442 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, any or all of the components within the memory 418 and memory 442 can be implemented as a neural network.

Figure 5:
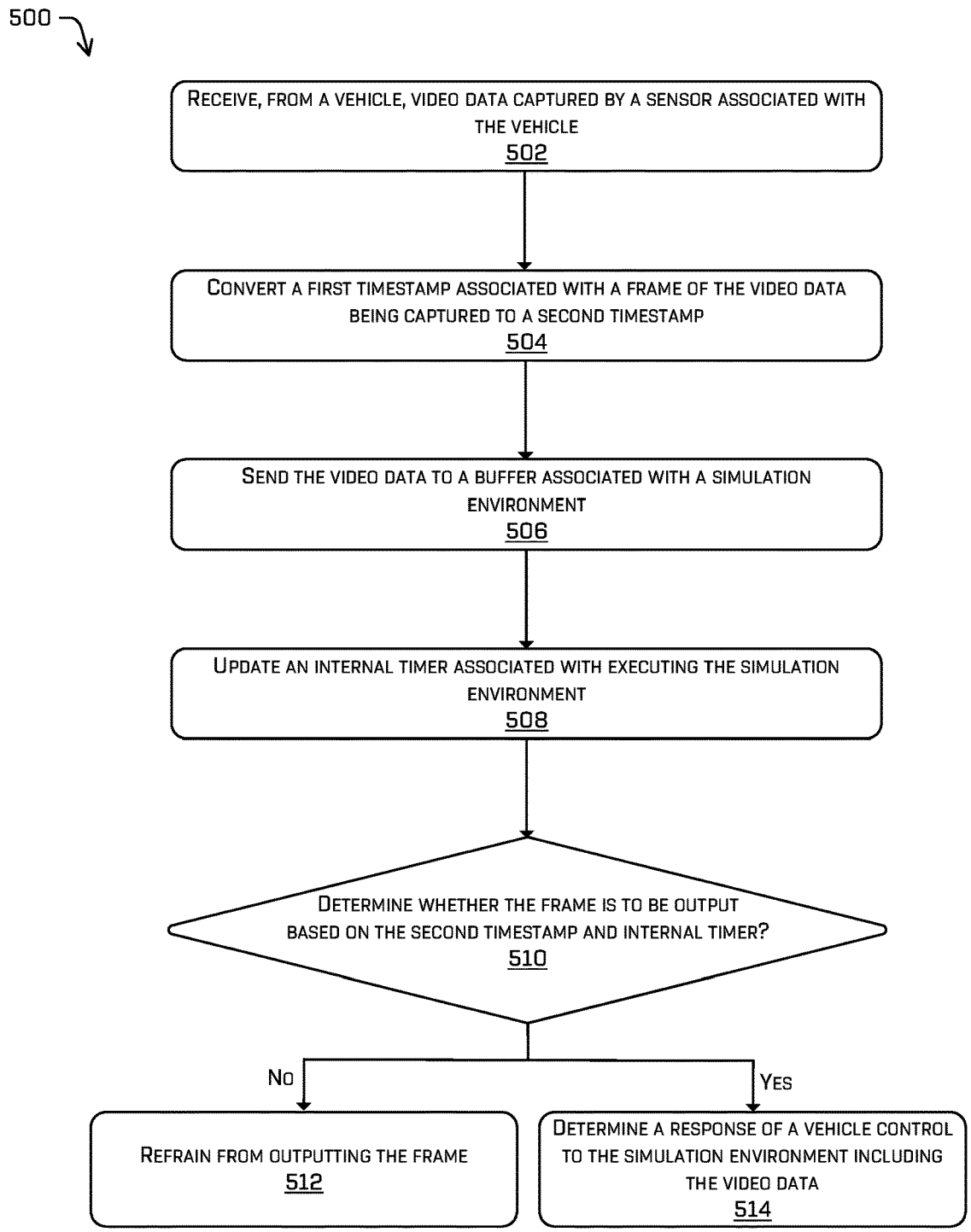
FIG. 5 depicts an example process for utilizing adjusted timestamps and updated timers to perform simulations, in accordance with one or more examples of the disclosure.

FIG. 5 depicts an example process 500 for utilizing adjusted timestamps and updated timers to perform simulations, in accordance with examples of the disclosure.

At operation 502, the process may include receiving, from a vehicle, video data 106 captured by a sensor 108 associated with the vehicle. The receiving of the video data 106 can include receiving the video data 106 from a vehicle log (e.g., a data store, such as the data storage 110). The video data 106 can include one or more frames, including the frame 118. The video data 106 can include one or more timestamps associated with the frames, respectively. The timestamps can include the first timestamp 120.

At operation 504, the process may include converting a first timestamp 120 associated with a frame of the video data being captured to a second timestamp 130. The first timestamp 120 can be converted utilizing an adjustment factor (or "adjustment time") and/or the metric $Time_{Delta}$. The adjustment factor can include a processing time based at least in part on a delay (e.g., a delay with a value of (4*0.05) seconds) associated with a processing duration for a number of frames and a propagation time (e.g., $Time_{Travel}$).

At operation 506, the process may include sending the video data 106 to a buffer associated with a simulation environment. For example, the buffer may be included in a timing device 212.

At operation 508, the process may include updating an internal timer 138 associated with executing the simulation environment. For example, the internal timer 138 may be updated to be the updated timer 140.

At operation 510, the process may include determining whether to output the frame 118 based on the second timestamp 130 and the internal timer 138. In some instances, the frame 118 is output based on the updated timer 140, in response to updating the internal timer 138 to be the updated timer 140. For example, the frame 118 may be output (e.g., driven) to the timing device 212, and out of the buffer in the timing device 212 based on the second timestamp 130. A propagation delay associated with the frame 118 being delivered to the simulation device 216 may be accounted for based on the propagation time. The frame 118 may be driven out of the buffer in the timing device 212 by utilizing the updated timer 140. The internal timer 138 and the updated timer 140 may be an internal timer within the timing device 212, before and after updating of the internal timer, respectively. The frame 118 may be utilized and/or delivered for performing the simulation based on an internal timer of the execute device 218.

Based on determining the frame 118 is not to be output, the process can proceed to operation 512. Based on determining the frame 118 is to be output, the process can proceed to operation 514.

At operation 512, the process may include refraining from outputting the frame 118. If the frame 118 is not to be output, the internal timer 138, which may be updated as the updated timer 140, continues to run. The timesteps of the updated timer 140 continue to increment until a current timestep of the updated timer 140 is greater than or equal to the second timestamp 130. The current timestep of the updated timer 140 being greater than or equal to the second timestamp 130 is utilized to output the frame 118.

In some examples, the frame 118 may be output based on the current time, a threshold, and the current timestep of the updated timer 140. In those or other examples, the frame 118 may be output based on a combination of the current time and a threshold (e.g., a threshold time). In those or other examples, the frame 118 may be output based on a difference between the combination and the current timestep of the updated timer 140 being less than a threshold (e.g., a threshold difference).

In some examples, the frame 118 may be dropped based on a difference between the combination and the current timestep of the updated timer 140 being greater than the threshold. In those or other examples, the frame 118 may be dropped based on the difference being greater than the threshold, and based on the frame 118 not being previously driven due to various factors. The factors may include delays (e.g., system delays), one or more other factors, or any combination thereof.

At operation 514, the process may include determining a response of a vehicle control to the simulation environment including the video data 106. The response of the vehicle control being determined may be utilized to update the vehicle control based on output of the simulation.

EXAMPLE CLAUSES

A: A system comprising: one or more processors; and one or more non-transitory computer-readable media storing instructions executable by the one or more processors, wherein the instructions, when executed, cause the system to perform operations comprising: receiving video data captured by a sensor associated with an autonomous vehicle, the video data comprising an individual frame and a first timestamp associated with capturing the individual frame; determining a simulation time associated with processing the video data for use in a simulation environment; determining, based on the simulation time, the first timestamp, and an adjustment factor, a second timestamp associated with the individual frame; sending the video data to a buffer associated with the simulation environment; updating an internal timer associated with executing the simulation environment; determining to output the individual frame based on the second timestamp and the internal timer; and determining a response of a vehicle controller to the simulation environment including the video data.

B: The system of claim A, wherein determining the second timestamp comprises determining a difference between the simulation time and an original log start time, and adding the difference to the first timestamp, and wherein the simulation time is within a threshold time of a current time and derived using the adjustment factor.

C: The system of claim A or B, wherein the adjustment factor is based at least in part on a delay associated with a processing duration for a number of frames and a propagation time.

D: The system of any of claims A-C, the operations further comprising: counting a number of individual timesteps between receiving a first signal from a primary clock and a second signal from the primary clock; and updating the internal timer based on the number of individual timesteps.

E: The system of any of claims A-D, the operations further comprising: outputting the individual frame to a perception component to perform at least one of object detection, sensor fusion, or segmentation.

F: A method comprising: receiving sensor data captured by a sensor associated with a vehicle; converting a first timestamp associated with a frame of the sensor data to a second timestamp; sending the sensor data to a buffer associated with a simulation environment; updating an internal timer associated with executing the simulation environment; determining to output the frame based on the second timestamp and the internal timer; and determining a response of a vehicle controller to the simulation environment including the sensor data.

G: The method of claim F, further comprising: determining a simulation time associated with processing the sensor data for use in the simulation environment; and determining, based on the simulation time, an original log start time, and the first timestamp, the second timestamp associated with the frame, wherein the simulation time is within a threshold time of a current time and derived using an adjustment factor.

H: The method of claim F or G, further comprising: synchronizing the sensor data with one or more other sensor data of one or more other modalities.

I: The method of any of claims F-H, further comprising: determining a difference between a simulation time and an original log start time; and adding the difference to the first timestamp to determine the second timestamp, wherein the simulation time is derived using an adjustment factor, the adjustment factor being based on a delay between a data routing device and a timing device.

J: The method of any of claims F-I, further comprising: determining an adjustment factor based at least in part on a delay associated with a processing duration for a number of frames and a propagation time, wherein determining the second timestamp comprises determining a difference between a simulation time and an original log start time, and adding the difference to the first timestamp, and wherein the simulation time is within a threshold time of a current time and derived using the adjustment factor.

K: The method of any of claims F-J, further comprising: counting a number of individual timesteps between receiving a first signal from a primary clock and a second signal from the primary clock; and updating the internal timer based on the number of individual timesteps.

L: One or more non-transitory computer-readable media storing instructions executable by one or more processors, wherein the instructions, when executed, cause the one or more processors to perform operations comprising receiving video data captured by a sensor associated with a vehicle; converting a first timestamp associated with a frame of the video data to a second timestamp; sending the video data to a buffer associated with a simulation environment; updating an internal timer associated with executing the simulation environment; determining to output the frame based on the second timestamp and the internal timer; and determining a response of a vehicle controller to the simulation environment including the video data.

M: The one or more non-transitory computer-readable media of claim L, the operations further comprising: determining a simulation time associated with processing the video data for use in the simulation environment; and determining, based on the simulation time, an original log start time, and the first timestamp, the second timestamp associated with the frame, wherein the simulation time is within a threshold time of a current time and derived using an adjustment factor.

N: The one or more non-transitory computer-readable media of claim L or M, wherein converting the first timestamp to the second timestamp further comprises: determining, based on a simulation time, an original log start time, and the first timestamp, the second timestamp associated with the frame, wherein the simulation time is within a threshold time of a current time and derived using an adjustment factor.

O: The one or more non-transitory computer-readable media of any of claims L-N, the operations further comprising: determining a difference between a simulation time and an original log start time; and adding the difference to the first timestamp to determine the second timestamp, wherein the simulation time is derived using an adjustment factor, the adjustment factor being based on a delay between a data routing device and a timing device.

P: The one or more non-transitory computer-readable media of any of claims L-O, further comprising: determining an adjustment factor based at least in part on a delay associated with a processing duration for a number of frames and a propagation time, wherein determining the second timestamp comprises determining a difference between a simulation time and an original log start time, and adding the difference to the first timestamp, and wherein the simulation time is derived using the adjustment factor.

Q: The one or more non-transitory computer-readable media of any of claims L-P, the operations further comprising: counting a number of individual timesteps between receiving a first signal from a primary clock and a second signal from the primary clock; and updating the internal timer based on the number of individual timesteps.

R: The one or more non-transitory computer-readable media of any of claims L-Q, the operations further comprising: counting a first number of individual timesteps between receiving a first signal from a primary clock and a second signal from the primary clock; determining the first number of individual timestamps is less than a threshold number; and updating the internal timer to skip a second number of individual timesteps based on the first number of individual timestamps being less than the threshold number.

S: The one or more non-transitory computer-readable media of any of claims L-R, the operations further comprising: counting a first number of individual timesteps between receiving a first signal from a primary clock and a second signal from the primary clock; determining the first number of individual timestamps is greater than a threshold number; and updating the internal timer to insert a second number of individual timesteps based on the first number of individual timestamps being greater than the threshold number.

T: The one or more non-transitory computer-readable media of any of claims L-S, wherein determining to output the frame further comprises determining to output the frame based on a current timestep of the internal timer being greater than or equal to the second timestamp.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving video data captured by a sensor associated with an autonomous vehicle, the video data comprising an individual frame and a first timestamp associated with capturing the individual frame;
determining a simulation time associated with processing the video data for use in a simulation environment;
determining, based on the simulation time, the first timestamp, and an adjustment factor, a second timestamp associated with the individual frame;
sending the video data to a buffer associated with the simulation environment;
updating an internal timer associated with executing the simulation environment;
determining to output the individual frame based on the second timestamp and the internal timer; and
determining a response of a vehicle controller to the simulation environment including the video data.

2. The system of claim 1, wherein determining the second timestamp comprises determining a difference between the simulation time and an original log start time, and adding the difference to the first timestamp, and
wherein the simulation time is within a threshold time of a current time and derived using the adjustment factor.

3. The system of claim 1, wherein the adjustment factor is based at least in part on a delay associated with a processing duration for a number of frames and a propagation time.

4. The system of claim 1, the operations further comprising:
counting a number of individual timesteps between receiving a first signal from a primary clock and a second signal from the primary clock; and
updating the internal timer based on the number of individual timesteps.

5. The system of claim 1, the operations further comprising:
outputting the individual frame to a perception component to perform at least one of object detection, sensor fusion, or segmentation.

6. A method comprising:
receiving sensor data captured by a sensor associated with a vehicle;
converting a first timestamp associated with a frame of the sensor data to a second timestamp;
sending the sensor data to a buffer associated with a simulation environment;
updating an internal timer associated with executing the simulation environment;
determining to output the frame based on the second timestamp and the internal timer; and
determining a response of a vehicle controller to the simulation environment including the sensor data.

7. The method of claim 6, further comprising:
determining a simulation time associated with processing the sensor data for use in the simulation environment; and
determining, based on the simulation time, an original log start time, and the first timestamp, the second timestamp associated with the frame,
wherein the simulation time is within a threshold time of a current time and derived using an adjustment factor.

8. The method of claim 6, further comprising:
synchronizing the sensor data with one or more other sensor data of one or more other modalities.

9. The method of claim 6, further comprising:
determining a difference between a simulation time and an original log start time; and
adding the difference to the first timestamp to determine the second timestamp, wherein the simulation time is derived using an adjustment factor, the adjustment factor being based on a delay between a data routing device and a timing device.

10. The method of claim 6, further comprising:
determining an adjustment factor based at least in part on a delay associated with a processing duration for a number of frames and a propagation time,
wherein determining the second timestamp comprises determining a difference between a simulation time and an original log start time, and adding the difference to the first timestamp, and
wherein the simulation time is within a threshold time of a current time and derived using the adjustment factor.

11. The method of claim 6, further comprising:
counting a number of individual timesteps between receiving a first signal from a primary clock and a second signal from the primary clock; and
updating the internal timer based on the number of individual timesteps.

12. One or more non-transitory computer-readable media storing instructions executable by one or more processors, wherein the instructions, when executed, cause the one or more processors to perform operations comprising:
receiving video data captured by a sensor associated with a vehicle;
converting a first timestamp associated with a frame of the video data to a second timestamp;
sending the video data to a buffer associated with a simulation environment;
updating an internal timer associated with executing the simulation environment;
determining to output the frame based on the second timestamp and the internal timer; and
determining a response of a vehicle controller to the simulation environment including the video data.

13. The one or more non-transitory computer-readable media of claim 12, the operations further comprising:
determining a simulation time associated with processing the video data for use in the simulation environment; and
determining, based on the simulation time, an original log start time, and the first timestamp, the second timestamp associated with the frame,
wherein the simulation time is within a threshold time of a current time and derived using an adjustment factor.

14. The one or more non-transitory computer-readable media of claim 12, wherein converting the first timestamp to the second timestamp further comprises:
determining, based on a simulation time, an original log start time, and the first timestamp, the second timestamp associated with the frame,
wherein the simulation time is within a threshold time of a current time and derived using an adjustment factor.

15. The one or more non-transitory computer-readable media of claim 12, the operations further comprising:
determining a difference between a simulation time and an original log start time; and
adding the difference to the first timestamp to determine the second timestamp,
wherein the simulation time is derived using an adjustment factor, the adjustment factor being based on a delay between a data routing device and a timing device.

16. The one or more non-transitory computer-readable media of claim 12, further comprising:
determining an adjustment factor based at least in part on a delay associated with a processing duration for a number of frames and a propagation time,
wherein determining the second timestamp comprises determining a difference between a simulation time and an original log start time, and adding the difference to the first timestamp, and
wherein the simulation time is derived using the adjustment factor.

17. The one or more non-transitory computer-readable media of claim 12, the operations further comprising:
counting a number of individual timesteps between receiving a first signal from a primary clock and a second signal from the primary clock; and
updating the internal timer based on the number of individual timesteps.

18. The one or more non-transitory computer-readable media of claim 12, the operations further comprising:
counting a first number of individual timesteps between receiving a first signal from a primary clock and a second signal from the primary clock;
determining the first number of individual timestamps is less than a threshold number; and
updating the internal timer to skip a second number of individual timesteps based on the first number of individual timestamps being less than the threshold number.

19. The one or more non-transitory computer-readable media of claim 12, the operations further comprising:
counting a first number of individual timesteps between receiving a first signal from a primary clock and a second signal from the primary clock;
determining the first number of individual timestamps is greater than a threshold number; and
updating the internal timer to insert a second number of individual timesteps based on the first number of individual timestamps being greater than the threshold number.

20. The one or more non-transitory computer-readable media of claim 12, wherein determining to output the frame further comprises determining to output the frame based on a current timestep of the internal timer being greater than or equal to the second timestamp.

* * * * *